United States Patent
Yamagishi

(10) Patent No.: US 9,854,276 B2
(45) Date of Patent: Dec. 26, 2017

(54) INFORMATION PROCESSING DEVICE, INFORMATION PROCESSING METHOD, AND PROGRAM

(71) Applicant: Saturn Licensing LLC, New York, NY (US)

(72) Inventor: Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 75 days.

(21) Appl. No.: 14/400,953

(22) PCT Filed: May 15, 2013

(86) PCT No.: PCT/JP2013/063483
§ 371 (c)(1),
(2) Date: Nov. 13, 2014

(87) PCT Pub. No.: WO2013/176006
PCT Pub. Date: Nov. 28, 2013

(65) Prior Publication Data
US 2015/0150034 A1  May 28, 2015

(30) Foreign Application Priority Data
May 23, 2012  (JP) ................................. 2012-117117

(51) Int. Cl.
*H04N 21/234* (2011.01)
*H04N 21/643* (2011.01)
(Continued)

(52) U.S. Cl.
CPC ... *H04N 21/23418* (2013.01); *H04L 12/2836* (2013.01); *H04N 21/234309* (2013.01);
(Continued)

(58) Field of Classification Search
CPC ......... H04N 21/23418; H04N 21/4363; H04N 21/64322; H04N 21/44008;
(Continued)

(56) References Cited

U.S. PATENT DOCUMENTS

2003/0051252 A1  3/2003  Miyaoku et al.
2005/0273522 A1  12/2005  Kohler
(Continued)

FOREIGN PATENT DOCUMENTS

CN  1738419 A  2/2006
EP  1286541 A1  2/2003
(Continued)

OTHER PUBLICATIONS

Extended European Search Report Patent No. 13793581.3 dated Jan. 27, 2016.
(Continued)

*Primary Examiner* — Sumaiya A Chowdhury
(74) *Attorney, Agent, or Firm* — Lerner, David, Littenberg, Krumholz & Mentlik, LLP

(57) ABSTRACT

The present technology relates to an information processing device, an information processing method, and a program, which enable processing to be performed by absorbing a protocol difference when data is exchanged using different protocols. A first processing unit that processes data with a first device that performs identification of content; and a second processing unit that processes data with a second device that performs reproduction of content, and processes data with the first processing unit, are provided. Identification of content is performed based on ACR (Automatic Content Recognition), for example, the first device is an ACR server, and the first processing unit is able to work as an ACR client that communicates with each of a plurality of ACR servers that performs ACR using a different protocol.
(Continued)

The present technology is applicable to a protocol conversion gateway.

16 Claims, 23 Drawing Sheets

(51) Int. Cl.
*H04N 21/647* (2011.01)
*H04L 12/28* (2006.01)
*H04N 21/2343* (2011.01)
*H04N 21/4363* (2011.01)
*H04N 21/44* (2011.01)
*H04N 21/4402* (2011.01)
*H04N 21/436* (2011.01)
*H04N 21/462* (2011.01)

(52) U.S. Cl.
CPC ... *H04N 21/4363* (2013.01); *H04N 21/43615* (2013.01); *H04N 21/4402* (2013.01); *H04N 21/44008* (2013.01); *H04N 21/440218* (2013.01); *H04N 21/4622* (2013.01); *H04N 21/643* (2013.01); *H04N 21/64322* (2013.01); *H04N 21/64784* (2013.01)

(58) Field of Classification Search
CPC ....... H04N 21/4402; H04N 21/234309; H04N 21/64784; H04L 12/2836
See application file for complete search history.

(56) References Cited

U.S. PATENT DOCUMENTS

| | | | |
|---|---|---|---|
| 2008/0082510 A1* | 4/2008 | Wang | H04H 60/37 |
| 2009/0100147 A1* | 4/2009 | Igarashi | H04N 7/17309 |
| | | | 709/218 |
| 2010/0030642 A1* | 2/2010 | Huffman | G06Q 30/02 |
| | | | 705/14.49 |
| 2010/0034389 A1 | 2/2010 | Sakharov | |
| 2013/0202150 A1* | 8/2013 | Sinha | G06T 1/0021 |
| | | | 382/100 |

FOREIGN PATENT DOCUMENTS

| | | |
|---|---|---|
| EP | 2782336 A1 | 9/2014 |
| EP | 2830310 A1 | 1/2015 |
| JP | 2002-209204 A | 7/2002 |
| JP | 2005-531231 A | 10/2005 |
| JP | 2011-130040 A | 6/2011 |
| RU | 2339077 C1 | 11/2008 |

OTHER PUBLICATIONS

European Examination for Application No. EP 13793581.3 dated Sep. 19, 2016.
Chinese Office Action for Application No. 201380025750.8, dated Mar. 2, 2017.
Russian Office Action for Application No. 2014145704, dated Apr. 14, 2017.
International Search Report corresponding to PCT/JP2013/063483, dated Aug. 20, 2013, 1 pg.

* cited by examiner

- ACR QUERY IDENTIFIER
- FORM IDENTIFIER OF STORED SIGNATURE (WATERMARK OR FINGERPRINT)
- SERVICE IDENTIFIER
- CONTENT IDENTIFIER
- REPRODUCTION TIME (RELATIVE TIME FROM START OF CONTENT OR ABSOLUTE TIME)
- LOCAL TIMESTAMP
- OTHER RELATED METADATA REGARDING THE CONTENT AND CHANNEL (MAY BE DIFFERENT FOR EACH REPRODUCTION TIME)
- SOURCE ADDRESS
- SIGNATURE GENERATED BY ACR SERVER

INFORMATION PROCESSING DEVICE, INFORMATION PROCESSING METHOD, AND PROGRAM

CROSS-REFERENCE TO RELATED APPLICATION

The present application is a national phase entry under 35 U.S.C. §371 of International Application No. PCT/JP2013/063483 filed May 15, 2013, published on Nov. 28, 2013 as WO 2013/176006 A1, which claims priority from Japanese Patent Application No. JP 2012-117117 filed in the Japanese Patent Office on May 23, 2012.

TECHNICAL FIELD

The present technology relates to an information processing device, an information processing method, and a program. In more detail, the present technology relates to an information processing device, an information processing method, and a program, which enable services from respective servers, providing a plurality of services, to be able to be processed by a general-purpose client.

BACKGROUND ART

Along with a widespread of personal computers and digital home electrical appliances, interconnecting the devices over a home IP (Internet Protocol) network to thereby enjoy sharing digital content such as videos, audio, and photos becomes reality. For example, DLNA (Digital Living Network Alliance) has established technical specifications and implementation guidelines necessary for sharing digital content by those digital devices, with which devices of different venders are connectable with each other. This provides the industry standard of the home IP networks.

Meanwhile, there is also a change in the broadcast system. An IPTV service, a VOD (Video On Demand) service, and the like, which transmit video content, having been provided by terrestrial and satellite broadcasting conventionally, over IP broadband networks, are beginning to be put into commercial use. In such a service, an STB (Set Top Box) is installed in the home, and the STB is connected with a display device such as a television receiver, whereby the service can be received.

If the IPTV service and the VOD service become popular, user's needs for utilizing video content, provided by the IPTV service, in DLNA devices will increase, similarly to the case where the content of TV programs provided by typical broadcasting has been watched and listened by being shared by DLNA devices.

As a solution for realizing such needs, a system of converting the protocol, the media format, and the like of an IPTV service to a protocol, a media format, and the like of a DLNA device to thereby provide it to a home network-connected device, can be considered. It should be noted that a module for integration in a home network, which performs format conversion processing, is described in Patent Document 1.

CITATION LIST

Patent Document

Patent Document 1: Japanese Patent Application Laid-Open No. 2005-531231

SUMMARY OF THE INVENTION

Problems to be Solved by the Invention

As described above, watching and listening by connecting an STB to a television receiver is done not only in the IPTV service and the VOD service but also in cable-television broadcasting. In the case of watching and listening using the STB, audio data and video data are supplied from the STB to the television receiver.

For example, if a television receiver receives a program from a broadcast station not via an STB, there is a case where information such as program information and shop information introduced in the program, besides audio data and video data, is able to be received and provided to a user. However, in the case of receiving via an STB, only audio data and video data are supplied from the STB to the television receiver as described above, and such information is not supplied to the television receiver. Thus, it is impossible to present the information from the broadcast station to a user.

Further, in the case of watching and listening with use of an STB, a user performs watching and listening by using a remote controller of the STB, and tends not to use a remote controller of the television receiver. From a standpoint of the side providing a television receiver, it is desirable that a user uses a remote controller of the television receiver. Further, from a standpoint of the broadcast station side, it is desirable that a user utilizes information such as program information.

The present technology has been developed in view of such a situation. The present technology enables information associated with a program to be provided by a television receiver, in the case of watching and listening with use of an STB or the like.

Solutions to Problems

According to an aspect of the present technology, an information processing device according to an aspect of the present technology includes: a first processing unit that processes data with a first device that performs identification of content; and a second processing unit that processes data with a second device that performs reproduction of the content, and processes data with the first processing unit.

It is possible that the identification of the content is performed based on ACR (Automatic Content Recognition), the first device is an ACR server, and the first processing unit works as an ACR client that communicates with each of a plurality of ACR servers that performs the ACR using a different protocol.

It is possible that the information processing device being disposed in a gateway provided between the first device and the second device.

It is possible that the content is transmitted from a third device over an IP broadband network, and the information processing device further includes a third processing unit that processes data with the third device.

It is possible that the third processing unit decodes the content received, the first processing unit extracts data, required when the first device performs the identification, from the decoded content, and transmits the data to the first device, and upon receipt of a result of the identification from the first device, the first processing unit supplies the result to the second processing unit, and the second processing unit supplies the result to the second device.

It is possible that there is further included a fourth processing unit that processes data based on DLNA (Digital Living Network Alliance) with the second device, wherein the fourth processing unit converts the result from the second processing unit to be in a format based on the DLNA, and converts the content from the third processing unit to be in a format based on the DLNA.

It is possible that the second processing unit acquires information of identified content from each of the plurality of the ACR servers, generates information in which a plurality of units of the acquired information are gathered, and supplies the information to the second device.

According to an aspect of the present technology, an information processing method performed by an information processing device includes a first processing unit that processes data with a first device, and a second processing unit that processes data with a second device or the first processing unit, the method including the steps of: by the first processing unit, communicating with the first device that performs identification of content, and processing data exchanged through the communications, and by the second processing unit, communicating with the second device that performs reproduction of the content, and processing data exchanged through the communications, and processing data with the first processing unit.

According to an aspect of the present technology, a computer-readable program for causing a computer that controls an information processing device, the information processing device including a first processing unit that processes data with a first device, and a second processing unit that processes data with a second device or the first processing unit, to perform processing including: by the first processing unit, communicating with the first device that performs identification of content, and processing data exchanged through the communications, and by the second processing unit, communicating with the second device that performs reproduction of the content, and processing data exchanged through the communications, and processing data with the first processing unit.

In an information processing device, an information processing method, and a program, according to aspects of the present technology, data with a first device which performs identification of content is processed, and data with a second device which performs reproduction of content is processed.

Effects of the Invention

According to aspects of the present technology, it is possible to provide information associated with a program by a television receiver even in the case of watching and listening with use of an STB.

BRIEF DESCRIPTION OF DRAWINGS

FIG. 17 is a diagram for explaining an ACR response.

MODE FOR CARRYING OUT THE INVENTION

Hereinafter, an embodiment of the present technology will be described with reference to the drawings.

[Configuration of Content Delivery System]

Figure 1:
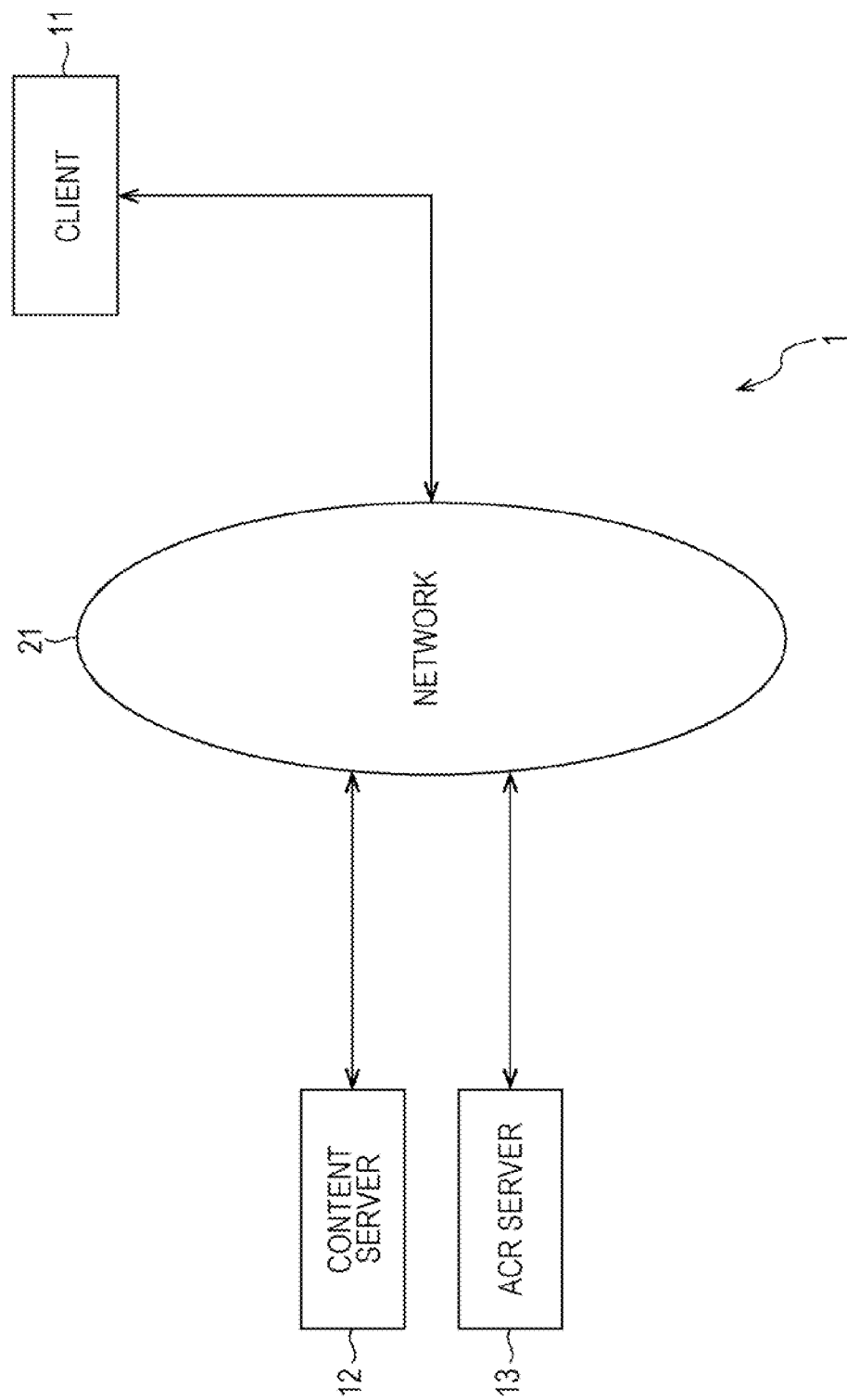
FIG. 1 is a diagram illustrating a configuration of a content delivery system.

FIG. 1 is a diagram illustrating a configuration of a content delivery system. A content delivery system 1 includes a client 11, a content server 12, and an ACR server 13. The client 11 to the ACR server 13 are interconnected over a network 21 such as the Internet. It should be noted that this configuration is an example, and a configuration including a STB (Set Top Box), a modem, and the like, as described below, is also acceptable.

The client 11 requests the content server 12 to deliver content over the network 21. When the content server 12 is requested to deliver content by the client 11, the content server 12 delivers data of the specified content corresponding to the request over the network 21.

It should be noted that a method of delivering content may be streaming or downloading, and content is delivered by unicasting (one-to-one) or multicasting (one-to-many).

The client 11 requests the ACR server 13 to identify content over the network 21. When the ACR server 13 is requested to identify content by the client 11, the ACR server 13 performs processing to identify the content being reproduced on the client 11. The ACR server 13 notifies the client 11 of the identification result over the network 21.

As processing to identify content, processing to identify (specify) target content based on video data or audio data constituting the content, which is called ACR (Automatic Content Recognition), is used. By using the ACR, it is possible to identify the target content, which is identical to the content being reproduced on the client 11, based on the video data or the audio data, without depending on information such as resolution of the moving images, aspect ratio, bit rate, or format.

The content delivery system 1 of FIG. 1 is configured as described above.

[Configuration of Client]

Figure 2:
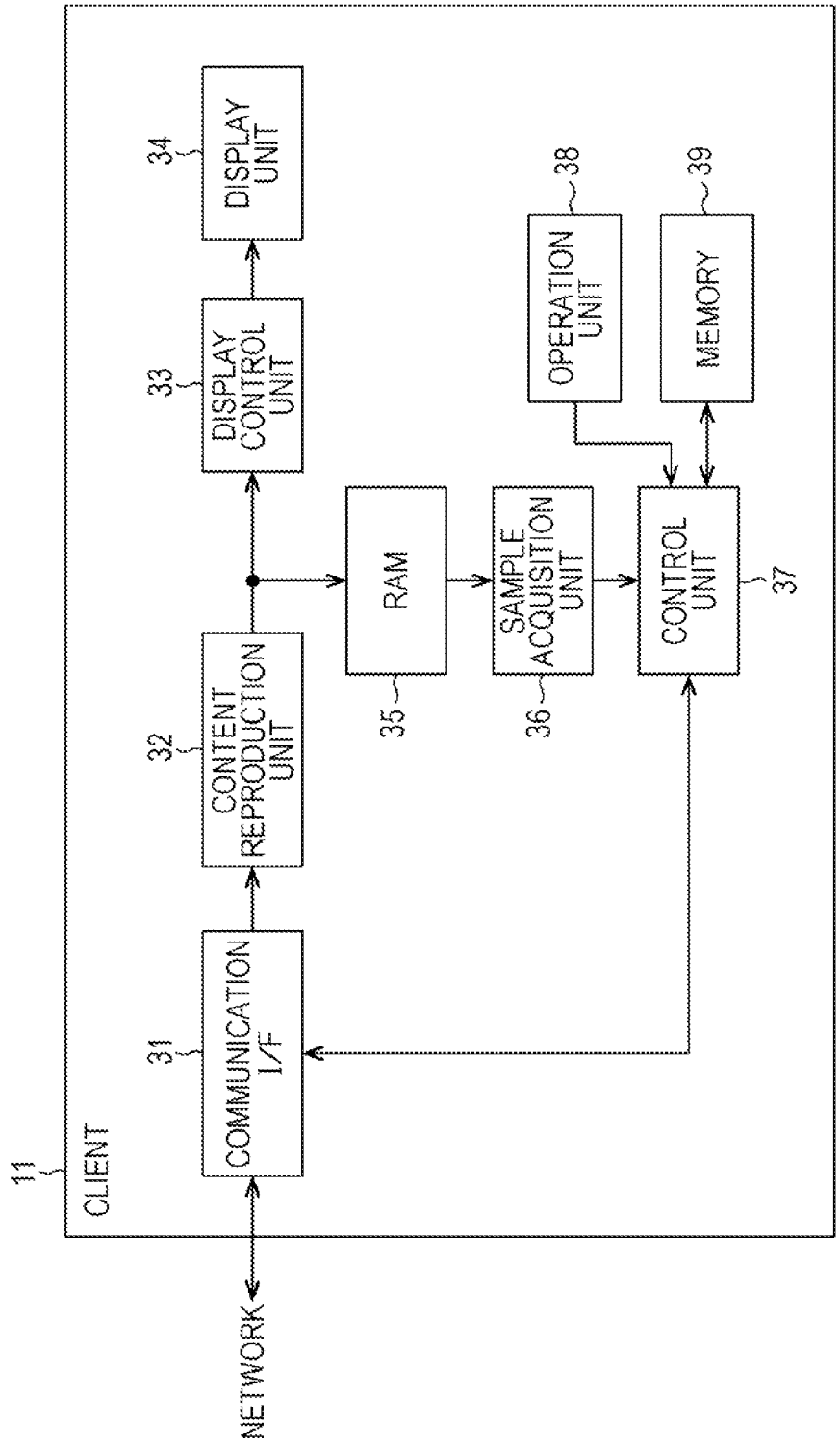
FIG. 2 is a diagram illustrating a configuration of a client.

FIG. 2 is a diagram illustrating a configuration of the client 11. The client 11 includes a communication I/F 31, a content reproduction unit 32, a display control unit 33, a display unit 34, a RAM 35, a sample acquisition unit 36, a control unit 37, a memory 38, and an operation unit 39.

The communication I/F 31 is connected with the content server 12 or the ACR server 13 over the network 21, in accordance with control by the control unit 37. The communication I/F 31 transmits various types of requests to the content server 12 or the ACR server 13 over the network 21, in accordance with control by the control unit 37.

When the communication I/F 31 receives data of content from the content server 12, the communication I/F 31 supplies the data of the content to the content reproduction unit 32, while when the communication I/F 31 receives an identification result from the ACR server 13, the communication I/F 31 supplies the identification result to the control unit 37.

The content reproduction unit 32 performs predetermined processing for obtaining video data, such as decoding, on the data of the content supplied from the communication I/F 31, and supplies the video data, obtained therefrom, to the display control unit 33. The display control unit 33 causes the display unit 34 to display the video data supplied from the content reproduction unit 32. It should be noted that audio data, obtained from the data of the content by the content reproduction unit 32, is supplied to a speaker (not shown) of a subsequent stage.

The RAM 35 temporarily stores video data of the content obtained by the content reproduction unit 32. The sample acquisition unit 36 acquires sample data from the video data of the content stored in the RAM 35, and supplies it to the control unit 37.

It should be noted that if an ACR client which performs processing of ACR is provided separately from a display device such as a television receiver, as described below, the separately provided ACR client includes the RAM 35 and the sample acquisition unit 36.

The control unit 37 controls operation of the respective units of the client 11. The memory 38 temporarily stores programs and data required for performing predetermined processing by the control unit 37. The operation unit 39 accepts various types of operation from a user, and supplies signals corresponding thereto to the control unit 37.

Further, the control unit 37 controls the communication I/F 31 so as to transmit sample data supplied from the sample acquisition unit 36 to the ACR server 13, and acquire an identification result from the ACR server 13.

The client 11 is configured as described above.

[Configuration of Content Server]

Figure 3:
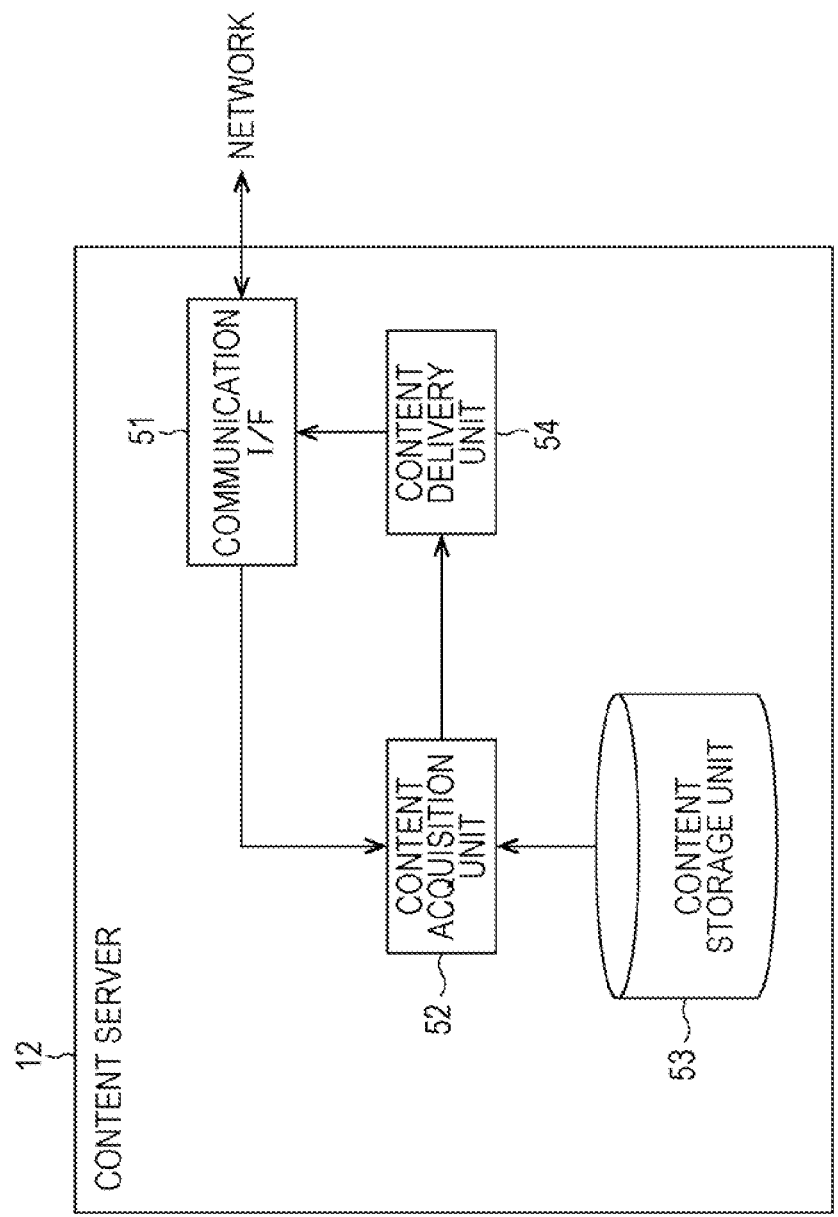
FIG. 3 is a diagram illustrating a configuration of a content server.

FIG. 3 is a diagram illustrating a configuration of the content server 12. The content server 12 includes a communication I/F 51, a content acquisition unit 52, a content storage unit 53, and a content delivery unit 54.

The communication I/F 51 is connected with the client 11 over the network 21. When the communication I/F 51 is requested to deliver content by the client 11 over the network 21, the communication I/F 51 supplies a content delivery request to the content acquisition unit 52.

Based on the content delivery request supplied from the communication I/F 51, the content acquisition unit 52 acquires data of the content corresponding to the delivery request from the content storage unit 53, and supplies it to the content delivery unit 54. The content storage unit 53 stores data of various types of content such as TV programs, movies, and the like, for example. However, data of such content may be acquired from external devices, besides the data stored in the content storage unit 53.

The content delivery unit 54 controls the communication i/F 51 to thereby deliver data of the content, supplied from the content acquisition unit 52, to the client 11 over the network 21.

The content server 12 is configured as described above. While description has been given as the content server 12 here, it may be an IPTV server such as IPTV, as described below.

[Configuration of ACR Server]

Figure 4:
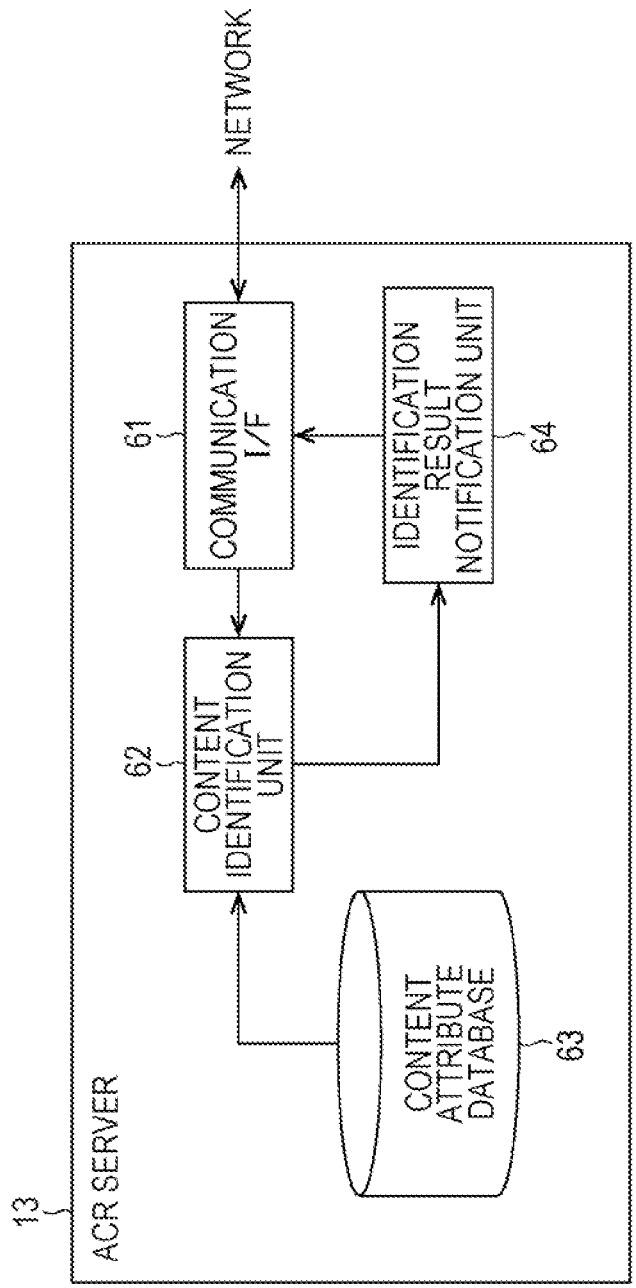
FIG. 4 is a diagram illustrating a configuration of an ACR server.

FIG. 4 is a diagram illustrating a configuration of the ACR server 13. The ACR server 13 includes a communication I/F 61, a content identification unit 62, a content attribute database 63, and an identification result notification unit 64. The communication I/F 61 is connected with the client 11 via the network 21. When the communication I/F 61 is requested to identify content by the client 11 over the network 21, the communication I/F 611 supplies an identification request to the content identification unit 62.

The content identification unit 62 performs processing to identify the content, based on sample data included in the identification request supplied from the communication I/F 61 and attribute data acquired from the content attribute database 63. The content identification unit 62 supplies the identification result to the identification result notification unit 64.

The content attribute database 63 stores sample data for identifying original content. To the original content, an identifier (content ID, content URL, or the like) has been assigned in advance. It should be noted that the content attribute database 63 may be provided separately from the ACR server 13 and connected with the ACR server 13 over the network 21.

To the identification result notification unit 64, an identification result from the content identification unit 62 is supplied. The identification result notification unit 64 controls the communication I/F 61 to thereby notify the client 11 of the identification result including relative reproduction time, over the network 21.

The ACR server 13 is configured as described above.

[Regarding Relationship Between ACR Server and Client]

While FIG. 1 illustrates only one ACR server 13, a plurality of different ACR servers 13 may exist. The different ACR server 13 means a server which performs identification using a sample extracted based on a different protocol, and is a server managed by a different provider.

The ACR server 13, unique to a provider, performs identification of content by using a protocol unique to the provider. A difference in protocol means, for example, a difference in the way of extracting a sample. For instance, the way of extracting sample data differs from each other, such as extracting a feature quantity according to the luminance from an image of one scene of a program, extracting a feature quantity from an image including a large motion, or extracting a feature quantity from a particular region within a screen, or the like.

Hereinafter, sample data is described as feature quantities. As sample data, while it is possible to use signature such as a watermark and a fingerprint, description will be continued using feature quantities as examples. Further, data referred to when content identification is performed on the ACR server 13 side is described as reference data as appropriate, and description will be continued based on the assumption that the reference data is stored in the content attribute database 63.

Figure 5:
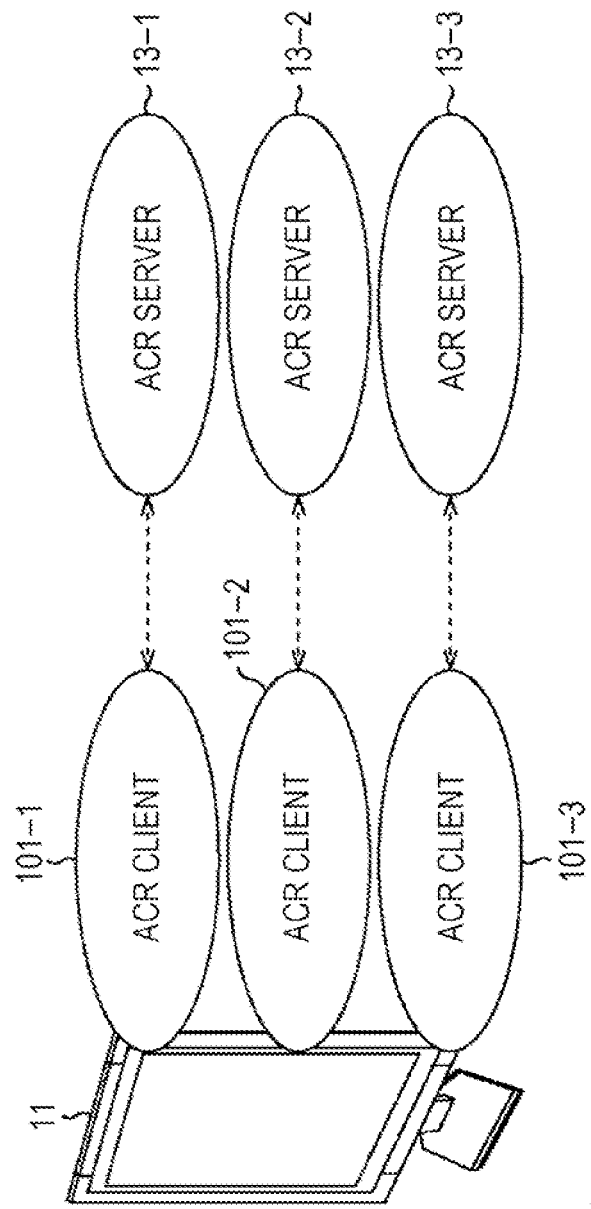
FIG. 5 is a diagram for explaining relationships between ACR servers and ACR clients.

As illustrated in FIG. 5, if there are a plurality of ACR servers 13, it is necessary to have an ACR client corresponding to each of the ACR servers 13. Referring to FIG. 5, in the example shown in FIG. 5, three different ACR servers 13, that is, ACR servers 13-1 to 13-3, are connected with the network. In order to receive services offered by these ACR servers 13-1 to 13-3, the client 11 needs to have ACR clients 101-1 to 101-3 corresponding to the respective ACR servers 13-1 to 13-3.

This means that the client 11 needs to have the ACR client 101-1 corresponding to the protocol of the ACR server 13-1, the ACR client 101-2 corresponding to the protocol of the ACR server 13-2, and the ACR client 101-3 corresponding to the protocol of the ACR server 13-3.

As described above, a plurality of ACR clients 101 must be implemented on the client 11, and in order to implement the ACR clients 101, a problem of an increase in the maintenance cost may be caused.

[Regarding General-Purpose ACR Client]

Figure 6:
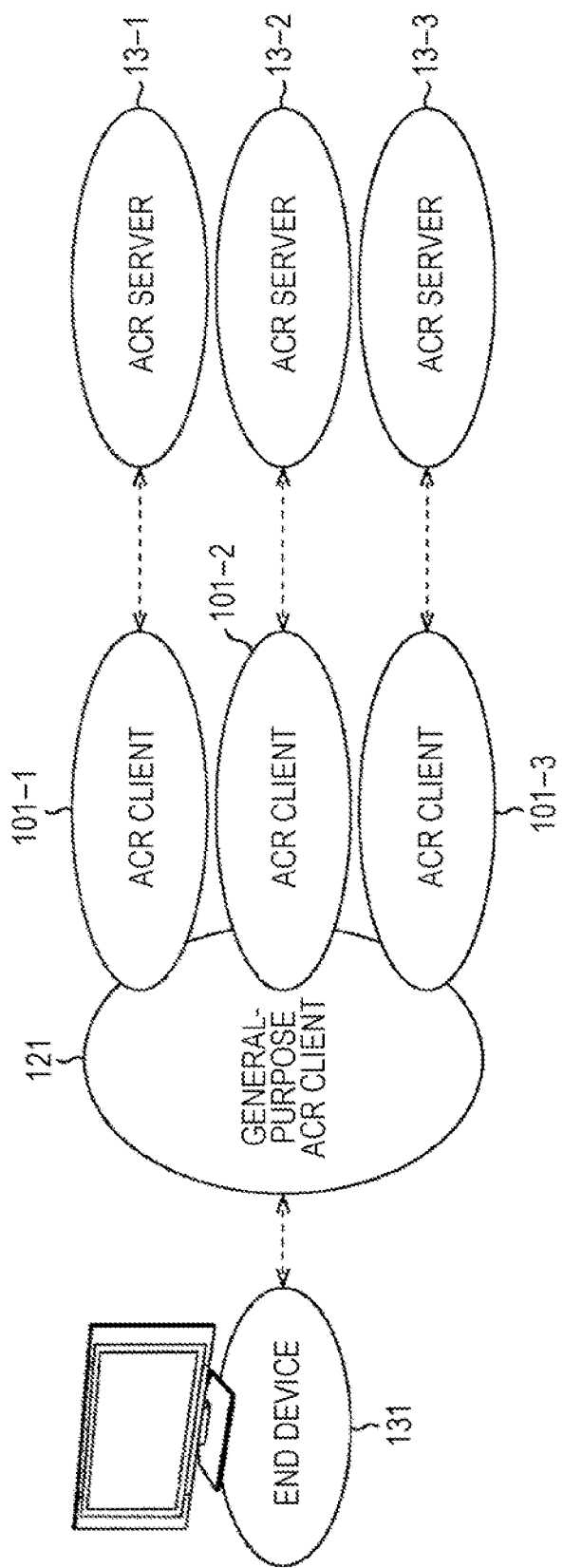
FIG. 6 is a diagram for explaining a general-purpose ACR client.

In view of the above, a general-purpose ACR client is implemented, as illustrated in FIG. 6. Referring to FIG. 6, a configuration in which a general-purpose ACR client 121, depending on the ACR service, is implemented in the protocol conversion gateway which intensively handles the ACR function is used. Thereby, it is possible to reduce a processing load for operating the ACR clients on an end device 131 side, and a burden and cost of implementing ACR clients depending on the respective ACR systems.

By implementing the general-purpose ACR client 121 in this way, in the end device 131, there is no need to implement an ACR protocol unique to each of the providers, whereby the costs for implementation and maintenance thereof can be reduced. Further, in each of the ACR services, if there is target content which cannot be solved by such a service (weak target content for such an ACR service), by making a request to an ACR service having a higher possibility of returning a more credible result in parallel, it is possible to improve the reliability in specifying content.

For example, the general-purpose ACR client 121 instructs the ACR client 101-1 to identify content, and the ACR client 101-1 makes an inquiry to the ACR server 13-1. It is assumed that the ACR client 101-1 receives a response that the content is not identified, from the ACR server 13-1. At this time, the general-purpose ACR client 121 makes the same instruction to the ACR client 101-2, again. As a result of making an inquiry to the ACR server 13-2 by the ACR client 101-2, it is assumed that the ACR server 13-2 receives a response that the content is identified.

In that case, even though the content is not identified by the ACR server 13-1, the content is identified by the ACR server 13-2. Although it has been described that an inquiry is made to the ACR server 13-2 subsequent to the ACR server 13-1, it is possible to make an inquiry simultaneously to the ACR server 13-1 and the ACR server 13-2.

In this way, as it is possible to find out the ACR server 13 capable of specifying the content and identify the content, it is also possible to improve the reliability in specifying the content, as described above.

As illustrated in FIG. 6, the ACR clients 101-1 to 101-3 communicate with the ACR servers 13-1 to 13-3 which identify content with different protocols, respectively, and process exchanged data. The general-purpose ACR client 121 communicates with each of the ACR clients 101-1 to 101-3 and processes exchanged data, and also processes data with the end device 131.

Further, as illustrated in FIG. 6, the ACR client 101 and the general-purpose ACR client 121 are provided between the ACR server 13 and the end device 131. Communications with the ACR server 13 side are performed using a wide area network such as the Internet, and communications with the end device 131 are performed using a limited area network such as a home network. The ACR client 101 and the general-purpose ACR client 121 can be provided at a point where such networks are switched.

It should be noted that the end device 131 illustrated in FIG. 6 is a device such as a television receiver, for example. Further, the general-purpose ACR client 121 may be configured as a device provided outside the television receiver physically, or configured as a device provided inside the television receiver physically.

[Regarding IPTV]

Next, IPTV will be described. Here, IPTV is a service through which video content, available through terrestrial or satellite broadcasting, is transmitted over IP broadband networks.

Figure 7:
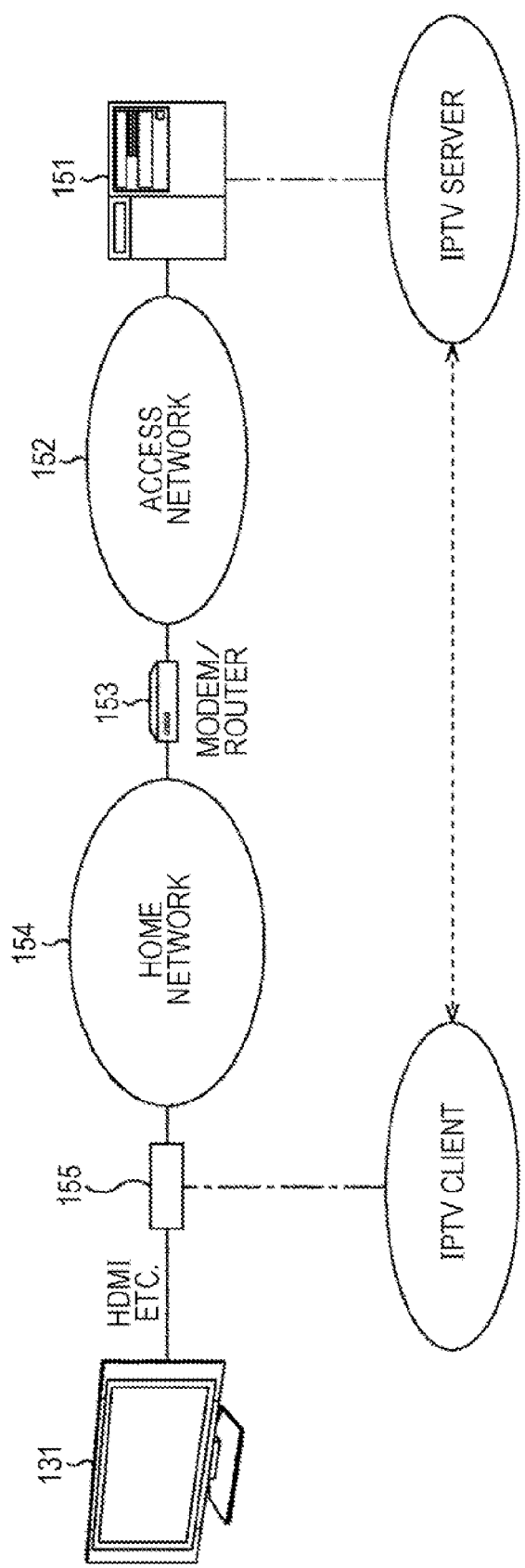
FIG. 7 is a diagram for explaining an exemplary configuration of a system.

FIG. 7 is a diagram illustrating an exemplary configuration of an IPTV system. An IPTV server 151, unique to a provider, is connected with a modem/router 153 over an access network 152. The modem/router 153 is connected with an STB 155 over a home network 154 consisting of the Ethernet (registered trademark), WiFi, or the like. The STB (Set Top Box) 155 is connected with the end device 131 such as a television receiver via a predetermined cable such as HDMI (registered trademark).

In such a system, a service provider (IPTV server 151) provides an IPTV service (VoD (Video on Demand), Linear TV (simultaneous broadcast distribution such as live)) with use of a unique IPTV protocol. As a unique protocol is used, the STB 155 implementing the protocol is provided from the provider, with which the end device 131 is connected via HDMI (registered trademark) or the like.

Audio data and video data of a program from the IP TV server 151 are supplied to the modem/router 153 over the access network 152, and further, supplied to the STB 155 over the home network 154. From the STB 151, the audio data and the video data are supplied to the end device 131 via a cable such as HDMI (registered trademark).

The STB 155 is connected with the end device 131 on a one-to-one basis, via a predetermined cable. As such, if there are a plurality of end devices 131 in the home (in the home network 154), as the STB 155 is required for each of the end devices 131, there are a plurality of STBs 155.

In the end device 131 with which the STB 155 is connected, a remote controller for the STB 155 is generally used for operation such as searching for a program and selection of a program to be watched and listened. If the end device 131 is a television receiver, for example, a remote controller for the television receiver tends not to be used.

While audio data and video data are supplied from the STB 155 to the end device 131, even if another type of data is supplied to the STB 155, such data is not supplied to the end device 131. For example, even if information associated with a program, such as the content of the program and information of the shops introduced in the program, is provided to the STB 155 as another type of data along with the audio data and the video data, the STB 155 extracts the audio data and the video data and supplies them to the end device 131. Accordingly, the end device 131 is not able to provide the user with the information associated with the program.

If the end device 131 is equipped with the general-purpose ACR client 121, it is possible to extract, by the general-purpose ACR client 121, feature quantities from the sounds provided by the audio data or the images provided by the video data, supplied from the STB 131, as sample data. Then, it is possible to supply the sample data to the ACR server 13, and identify the program from the sample data by the ACR server 13.

By supplying the information regarding the identified program from the ACR server 13 to the general-purpose ACR client 121, the end device 131 is able to acquire information regarding the program. By using the information regarding the program as information associated with the program described above, data not having been supplied from the STB 155 can be supplied to the end device 131. In order to watch such information associated with the program and the like, a remote controller of the end device 131 is used. Accordingly, the using frequency of the remote controller of the end device 131 can be increased.

Further, by using DLNA (Digital Living Network Alliance) described below, even if there are a plurality of end devices 131 in the home network 154, it is possible to realize a configuration in which a plurality of STBs 155 are not necessarily connected with the respective end devices 131.

[Regarding Configuration Using DLNA]

As a protocol realizing content sharing in a home network, DLNA is increasingly used widely. By implementing a module which converts IPTV protocol of a provider, provided from the outside of the home network, into DLNA protocol in the protocol gateway, it is possible to provide a television receiver and a monitor device with the IPTV service using a standardized unified interface named DLNA (referred to as IPTV-DLNA protocol conversion).

Figure 8:
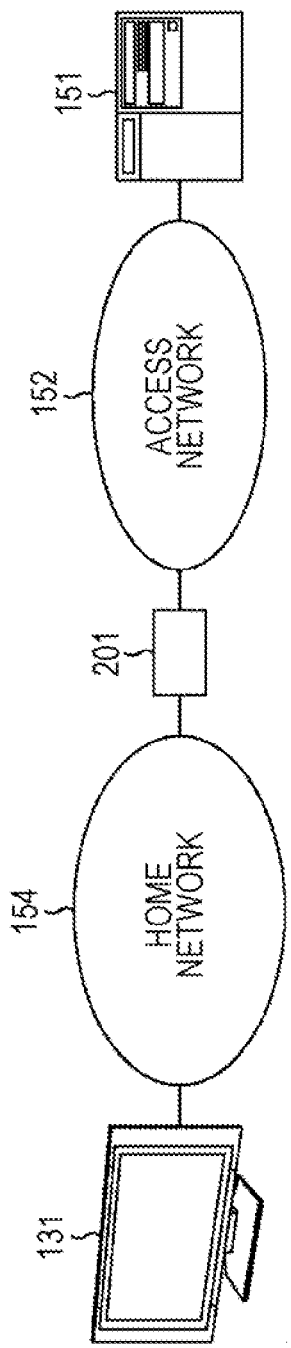
FIG. 8 is a diagram for explaining an exemplary configuration of a system.

For example, in the case of using DLNA, the system illustrated in FIG. 7 becomes the system illustrated in FIG. 8. In the system illustrated in FIG. 8, the IPTV server 151, unique to the provider, is connected with a protocol conversion gateway 201 over the access network 152. The protocol conversion gateway 201 is connected with the end device 131 such as a television receiver over the home network 154.

The system illustrated in FIG. 8 has a configuration in which the STB 155 is omitted. Further, in the protocol conversion gateway 201, a module which converts IPTV protocol into DLNA protocol is incorporated. Further, although not shown, the general-purpose ACR client 121 is provided between the end device 131 and the home network 154, between the protocol conversion gateway 201 and the home network 154, or in the protocol conversion gateway 201. The following description will be given based on the assumption that the general-purpose ACR client 121 is provided in the protocol conversion gateway 201.

According to the configuration illustrated in FIG. 8, a stream containing audio data and video data of a program from the IPTV server 151 is supplied to the protocol conversion gateway 201 over the access network 152. The protocol conversion gateway 201 converts the supplied data based on the IPTV protocol into data based on the DLNA protocol, and supplies it to the end device 131 over the home network 154.

Although not shown in FIG. 8, even if there are a plurality of end devices 131 in the home network 154, as the data based on the DLNA protocol is exchanged in the home network 154, a program from the IPTV server 151 can be watched and listened at each of the end devices 131, without setting up a plurality of STBs 155 depending on the service provider.

Meanwhile, as respective IPTV servers 151 may support different IPTV protocols corresponding to the respective providers providing services, the end device 131 side needs to have an IPTV client depending on each of the IPTV protocols. However, by using DLNA, it is possible to perform processing in which protocol differences are absorbed.

[As for Case where DNLA is Applied to IPTV]

Figure 9:
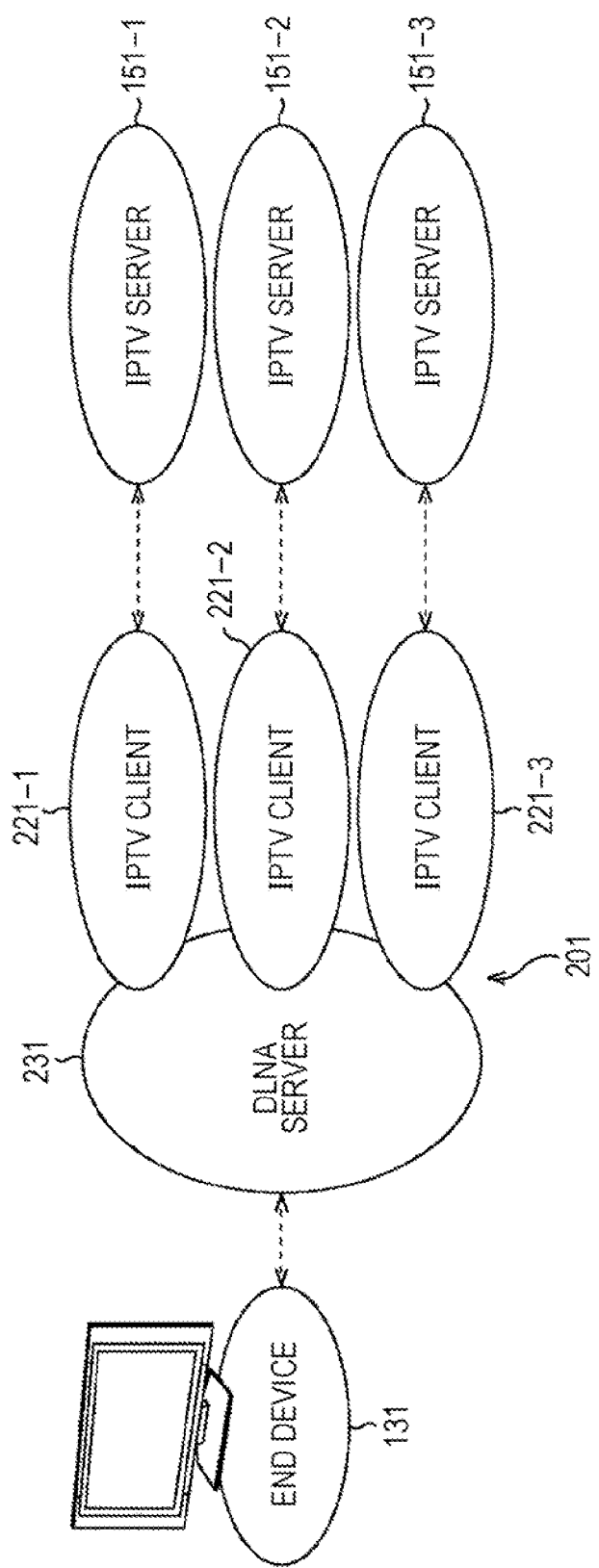
FIG. 9 is a diagram for explaining relationships between IPTV servers and IPTV clients.

FIG. 9 is a diagram illustrating an exemplary configuration in the case where a plurality of IPTV servers, providing services in different IPTV protocols, are connected with the access network 152. In the exemplary configuration illustrated in FIG. 9, three IPTV servers 151, that is, IPTV servers 151-1 to 151-3 are connected with the network. Further, the IPTV clients 221-1 to 221-3, corresponding to the IPTV 151-1 to 151-3 respectively, are provided.

The IPTV client 221-1 corresponding to the IPTV protocol of the IPTV server 151-1, the IPTV client 221-2 corresponding to the IPTV protocol of the IPTV server 151-2, and the IPTV client 221-3 corresponding to the IPTV protocol of the IPTV server 151-3 are provided on the end device 131 side. Specifically, the IPTV clients 221-1 to 221-3 are provided to the protocol conversion gateway 201.

The protocol conversion gateway 201 is also equipped with a DLNA server 231. This means that the protocol conversion gateway 201 applies processing based on the DLNA protocol, by the DLNA server 231, to the data having been processed based on the IPTV protocol in the IPTV client 221 which is any one of the IPTV clients 221-1 to 221-3, and outputs it to the end device 131. The end device 131 corresponds to a DLNA client.

In this way, in the example illustrated in FIG. 9, the IPTV clients 221-1 to 221-3 communicate with the IPTV servers 151-1 to 151-3 which transmit content using different protocols respectively, and perform processing of data (content) with the IPTV servers 151-1 to 151-3. Further, the DLNA server 231 also communicates with the end device 131, and processes data with the end device 131.

Here, with reference to FIG. 10, additional description will be given regarding conversion in the protocol conversion gateway 201. Referring to A of FIG. 10, when streaming is performed in HTTP (Hyper Text Transfer Protocol) adaptive streaming from the IPTV server 151, a content stream based on HTTP is transmitted from the IPTV server 151 to the protocol conversion gateway 201 over the access network 152 (not shown in A of FIG. 10).

In the protocol conversion gateway 201, the content stream from the IPTV server 151 is acquired by the IPTV client 221. The IPTV client 221 decodes the audio data and decodes the video data, from the acquired content stream. The decoded audio data and video data are supplied to the DLNA server 231.

The DLNA server 231 converts the supplied audio data and video data into data of a HTTP streaming protocol in a format based on the DLNA protocol, and transmits it to the end device 131 which is a DLNA client over the home network 154. As the end device 131 is a DLNA client, it is able to acquire and reproduce data in DLNA-based format.

Figure 10:
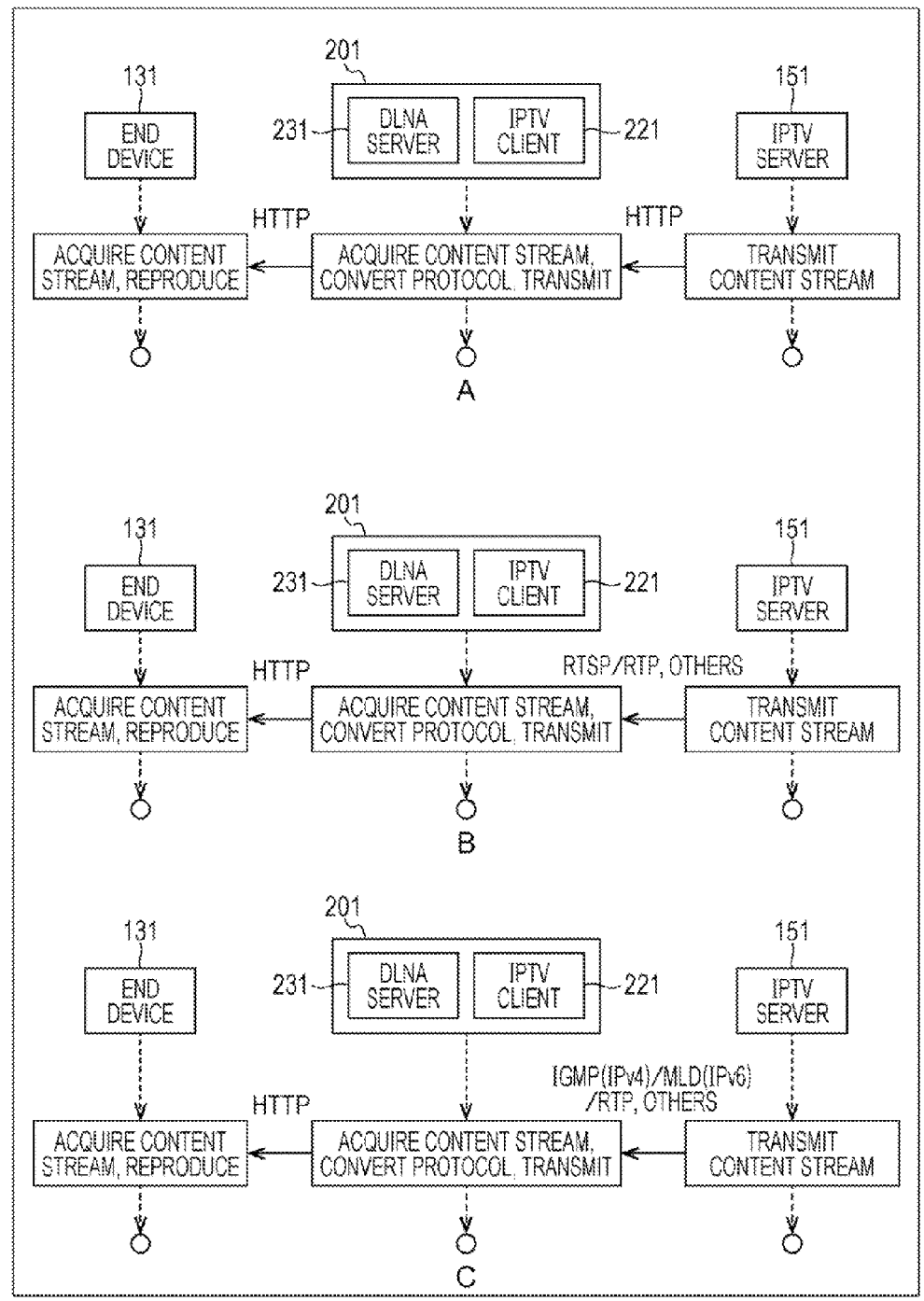
FIG. 10 is a diagram for explaining a protocol conversion gateway.

Referring to B of FIG. 10, when streaming is performed in RTSP/RTP (Real Time Streaming Protocol/Real-time Transport Protocol) streaming from the IPTV server 151, the content stream based on RTSP/RTP is transmitted from the IPTV server 151 to the protocol conversion gateway 201 over the access network 152.

In the protocol conversion gateway 201, the IPTV client 221 acquires the content stream from the IPTV server 151. The IPTV client 221 decodes the audio data and decodes the video data, from the acquired content stream. The decoded audio data and video data are supplied to the DLNA server 231.

The DLNA server 231 converts the supplied audio data and video data into data of HTTP streaming protocol in a format based on the DLNA protocol, and transmits it to the end device 131 which is a DLNA client over the home network 154. As the end device 131 is a DLNA client, it is able to acquire and reproduce data in DLNA-based format.

Referring to C of FIG. 10, when streaming is performed in multicast streaming such as IGMP (Internet Group Management Protocol) of IPv4, MLD (Multicast Listener Discovery) of IPv6, or RTP from the IPTV server 151, a content stream based on IGMP, MLD, or RTP is transmitted from the IPTV server 151 to the protocol conversion gateway 201 over the access network 152.

In the protocol conversion gateway 201, the content stream from the IPTV server 151 is acquired by the IPTV client 221. The IPTV client 221 decodes the audio data and decodes the video data, from the acquired content stream. The decoded audio data and video data are supplied to the DLNA server 231.

The DLNA server 231 converts the supplied audio data and video data into data of HTTP streaming protocol in a format based on the DLNA protocol, and transmits it to the end device 131 which is a DLNA client, over the home network 154. As the end device 131 is a DLNA client, it is able to acquire and reproduce data in DLNA-based format.

In this way, the content provided by streaming from the IPTV server 151 is in a format unique to the IPTV service and in a protocol such as HTTP, RTSP/RTP, IGMP, or the like, for example. Further, the content provided by streaming is provided from the IPTV server 151 offering the IPTV service, over the access network 152.

Then, in the protocol conversion gateway 201, the content in a format unique to the IPTV service, acquired by streaming using a protocol unique to the IPTV service from the IPTV server 151, is converted to the HTTP streaming protocol in DLNA-based format, and is provided by streaming to the end device 131 which is a DLNA client.

A DLNA client has a function of acquiring content by streaming from the DLNA server 231 implemented in the gateway using a streaming protocol (HTTP streaming of DLNA) defined by DLNA, and reproducing the content. Accordingly, the end device 131 is able to reproduce a program from the IPTV server 151, even if the STB 155 is not connected.

As the form illustrated in FIG. 9 and FIG. 10, in the present embodiment, DLNA which is a protocol between the content server in the home and the content client is implemented in the protocol conversion gateway 201 as an interface common to IPTV protocols unique to the respective providers. Thereby, there is no need to implement an IPTV protocol unique to each provider in the end device 131 such as a television receiver.

Further, as there is no need to add and provide the STB 155 each time the end device 131 is added, there is an advantage even for the provider of reducing the maintenance cost of the STB 155. Further, as described below, content retrieval of an IPTV service which is different for each provider and content retrieval in the home network can be performed integrally in the same DLNA framework, whereby user convenience for content retrieval can be improved.

In this way, when an IPTV service is received using DLNA, conversion is performed by the protocol conversion gateway 201, as described with reference to FIG. 10. This means that content in a format unique to the IPTV service is transcoded to be in a format based on the DLNA standard. When transcoding, DRM (content protection) or the like unique to the IPTV service is released to thereby decode the content once, the video data and the audio data are developed on the buffer, and the content is again encoded in a streaming format of DLNA standard.

When decoding the content, it is possible to allow the content developed on the buffer to pass through the general-purpose ACR client 121 (FIG. 6) to generate feature quantities (sample data, signature) for ACR so as to cause the content to be specified by the ACR server 13. Further, by acquiring metadata of the specified content and providing it in a system available to the end device 131 of the conversion destination of the protocol, it is possible to realize delivery of metadata and related applications using ACR services, without being aware of differences in a plurality of different ACR services and without implementing a plurality of different ACR clients in the end device 131.

As such, ACR using a decode result performed by the IPTV client 221 will be described below.

It should be noted that a flow of processing or the like, described below, is an example, and does not show a limitation. Accordingly, there is also a case where a database required for signature matching serving as a reference on the ACR client side is downloaded from the ACR server side, and matching with signature extracted from sample content is performed on the client side, for example.

[Regarding Configuration of System]

Here, an exemplary configuration of a system when the general-purpose ACR client. 121 is realized using DLNA will be described with reference to FIG. 11.

Figure 11:
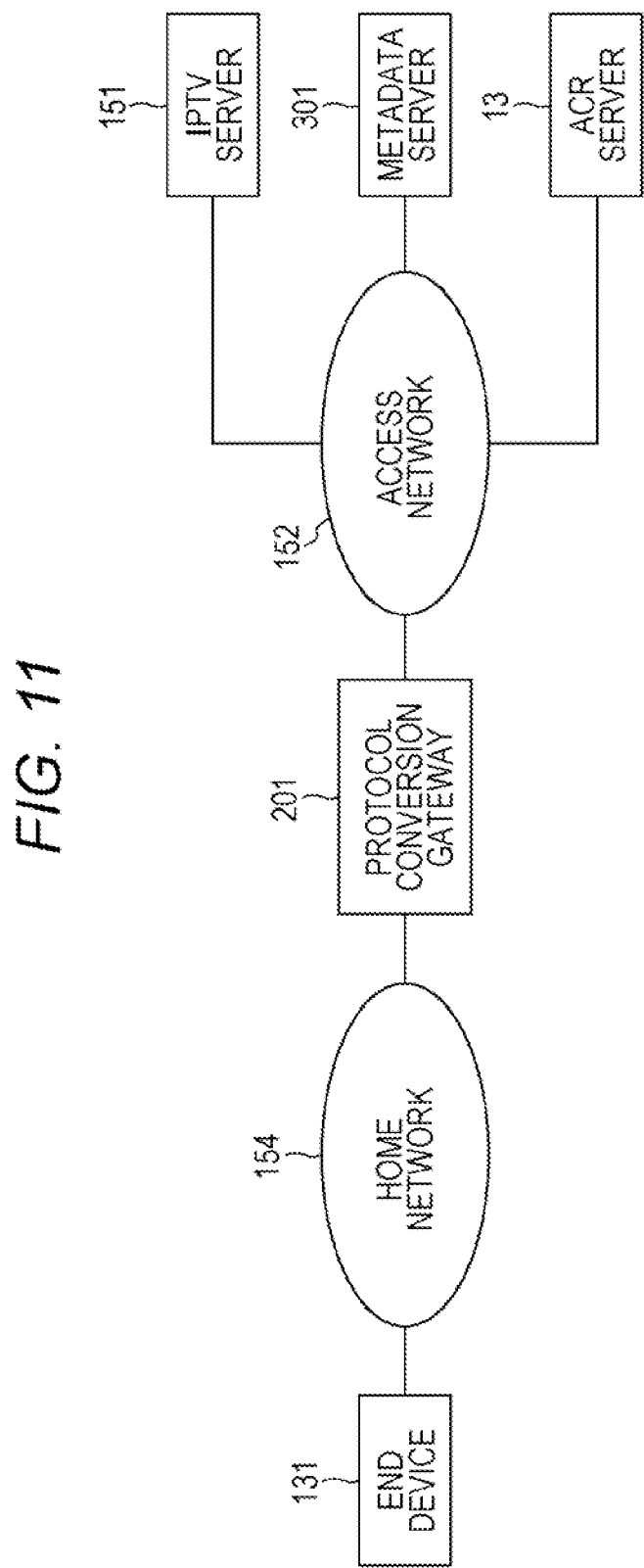
FIG. 11 is a diagram illustrating an exemplary configuration of a system.

In the system illustrated in FIG. 11, the ACR server 13, the IPTV server 151, and a metadata server 301 are connected with the access network 152. Further, the protocol conversion gateway 201 is connected with the access network 152. Inside the home and outside the home are divided with the protocol conversion gateway 201 serving as the boundary.

Inside the home, it is configured that the protocol conversion gateway 201 and the end device 131 are able to exchange data with each other over the home network 154. It should be noted that while only one end device 131 is shown in FIG. 11, the end device 131 may be plural, of course. Further, while the number of each of the ACR server 13, the IPTV server 151, and the metadata server 301 is only one in FIG. 11, they may be plural, of course.

[Regarding Configuration of Protocol Conversion Gateway]

Figure 12:
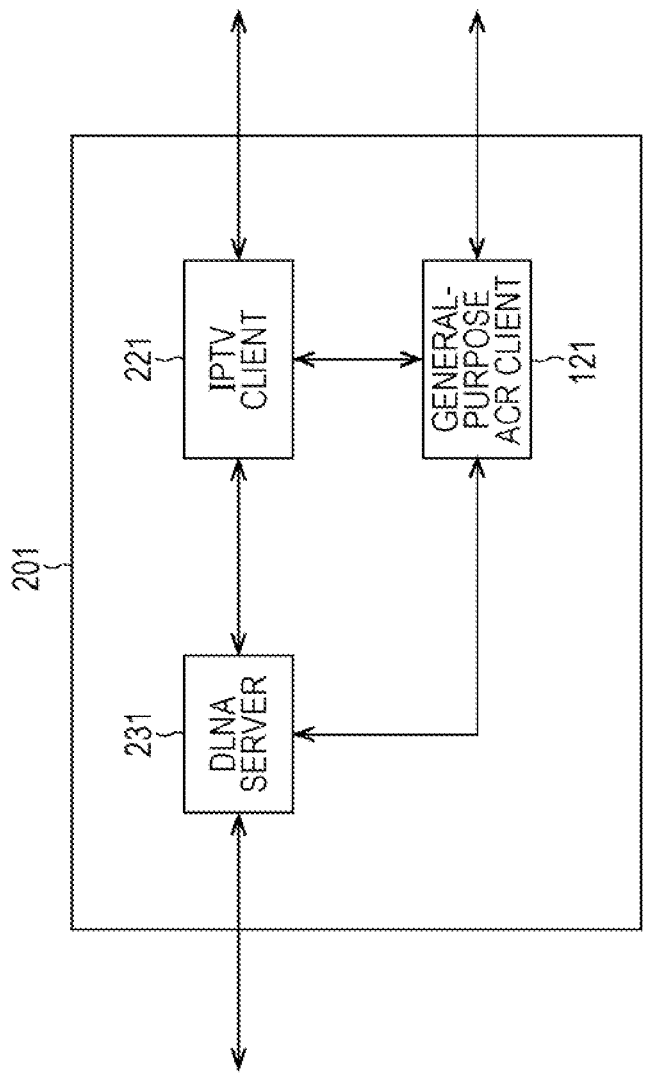
FIG. 12 is a diagram illustrating an exemplary internal configuration of a protocol conversion gateway.

FIG. 12 is a diagram illustrating the internal configuration of the protocol conversion gateway 201 illustrated in FIG. 11. The protocol conversion gateway 201 is configured to include the IPTV client 221 which exchanges data with the IPTV server 151, the general-purpose ACR client 121 which exchanges data with the ACR server 13, and the DLNA server 231 which exchanges data with the end device 131.

It should be noted that while description will be continued using the protocol conversion gateway 201 illustrated in FIG. 12 as an example in the below description, in more detail, the IPTV client 221 is configured of a plurality of IPTV clients, that is, the IPTV clients 221-1 to 221-3, for example, as illustrated in FIG. 9. Further, the general-purpose ACR client 121 also has a function of interfacing a plurality of ACR clients, that is, the ACR clients 101-1 to 101-3, for example, as illustrated in FIG. 6, and the protocol conversion gateway 201 is configured to include the ACR clients 101-1 to 101-3.

While description will be continued herein based on the assumption that the general-purpose ACR client 121 performs processing, the processing described below is performed by performing processing in conjunction with the ACR client 101 as appropriate.

For example, in the below description, processing to receive supply of audio data and video data supplied from the IPTV client 221, extract data such as feature quantities for identifying content, and making an inquiry to the ACR server 13, is described to be performed by the general-purpose ACR client 121 as a representative, and such a configuration is possible.

However, it is also possible to have a configuration in which each of the ACR clients 101-1 to 101-3 extracts data such as feature quantities and makes an inquiry to each of the ACR servers 13-1 to 13-3, and the general-purpose ACR client 121 receives the inquiry result thereof and performs processing.

Further, it is also possible to have a configuration in which based on an instruction by the general-purpose ACR client 121, any ACR client 101 of the ACR clients 101-1 to 101-3 extracts data such as feature quantities and makes an inquiry to the ACR server 13, and the general-purpose ACR client 121 receives the inquiry result thereof and performs processing.

In this way, although not shown in FIG. 12, the general-purpose ACR client 121 and the ACR client 101 perform processing in conjunction with each other.

While the details of the processing performed by the protocol conversion gateway 201 illustrated in FIG. 12 will be described below, the basic processing is that the IPTV client 221 receives a content stream and decodes it. The content decoded by the IPTV client 221 is supplied to the general-purpose ACR client 121 and the DLNA server 231.

The general-purpose ACR client 121 extracts, from the decoded content, data (data such as feature quantities) which is required when the ACR server 13 identifies content, and transmits it to the ACR server 13. Further, when the general-purpose ACR client 121 receives an identification result from the ACR server 13, the general-purpose ACR client 121 supplies the received identification result to the end device 131 via the DLNA server 231.

It should be noted that while the protocol conversion gateway 201 illustrated in FIG. 12 is configured such that data from the general-purpose ACR client 121 is supplied to the DLNA server 231, and is supplied from the DLNA server 231 to the end device 131, a configuration in which the general-purpose ACR client 121 and the end device 131 are able to exchange data directly, without via the DLNA server 231, is also possible.

In the protocol conversion gateway 201 illustrated in FIG. 12, communications with the end device 131 are performed by the DLNA server 231. This means that the DLNA server 231 communicates with the end device 131, and performs processing of data with the end device 131. Specifically, processing to convert data from the general-purpose ACR client 121 or the IPTV client 221 into data in DLNA-based format and supply it to the end device 131 is performed.

[Regarding Accumulation of Metadata]

Figure 13:
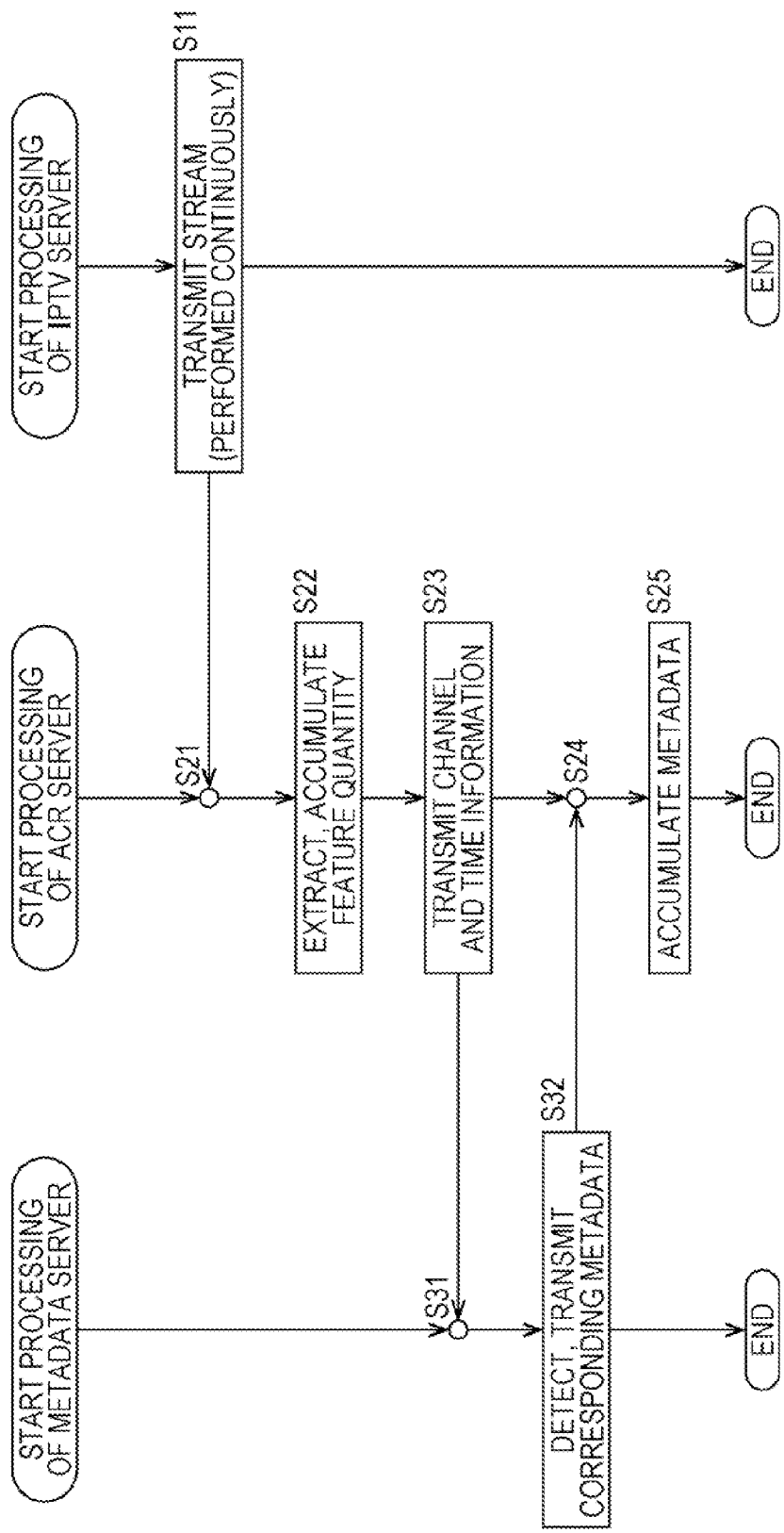
FIG. 13 is a diagram for explaining processing related to storage of metadata.

Next, processing in the system illustrated in FIG. 11 will be described. First, processing related to accumulation of metadata of the ACR server 13 will be described with reference to the flowchart of FIG. 13. The ACR server 13 receives a program being broadcasted in the IPTV server 151, accumulates reference data for specifying the program (content), acquires metadata accumulated in the metadata server 301, and accumulates it. The ACR server 13 provides accumulated metadata in response to a request from the general-purpose ACR client 121.

The ACR server 13 accumulates reference data and accumulates metadata so as to be able to supply metadata. Processing regarding the accumulation will be described.

At step S11, the IPTV server 151 transmits a stream. Transmission of the stream is performed continuously. The stream from the IPTV server 151 is received by the ACR server 13 at step 321 over the access network 152. At step S22, the ACR server 13 extracts and accumulates feature quantities. The ACR server 13 generates data for specifying the content from the audio data and the video data extracted from the stream, based on a predetermined protocol.

For example, audio data is sampled in predetermined timing, and audio data at that time is used as a feature quantity. Further, a feature quantity of luminance is extracted from an image based on video data sampled in predetermined timing, which is used as a feature quantity. The types of feature quantities to be extracted and generated depend on protocols with which providers extract and generate feature quantities. Further, signature such as a watermark, a fingerprint, or the like is also acceptable.

The feature quantities are accumulated in the content attribute database 63 (FIG. 4) of the ACR server 13. The ACR server 22 recognizes the airtime of the content (e.g., broadcasted program) from which the feature quantities are extracted and the channel through which it is broadcasted. From the airtime and the channel, the program can be specified uniquely. As such, at step 323, information about the channel and the airtime is transmitted to the metadata server 301 over the access network 152.

At step S31, upon receipt of the information about the channel and the airtime from the ACR server 13, at step S32, the metadata server 301 specifies the corresponding content (program), detects metadata regarding the content, and transmits it to the ACR server 13. In the metadata server 301, metadata has been managed in advance in association with content. It should be noted that while it has been described "specifying the corresponding content (program)" here, the metadata server 301 may be configured such that metadata which is uniquely specified from the information about the channel and the airtime is detected. As such, specifying the content is not mandatory.

At step S24, the ACR server 13 receives metadata from the metadata server 301, and at step S25, the ACR server 13 accumulates the received metadata in the content attribute database 63 in association with another unit of data.

Figure 14:
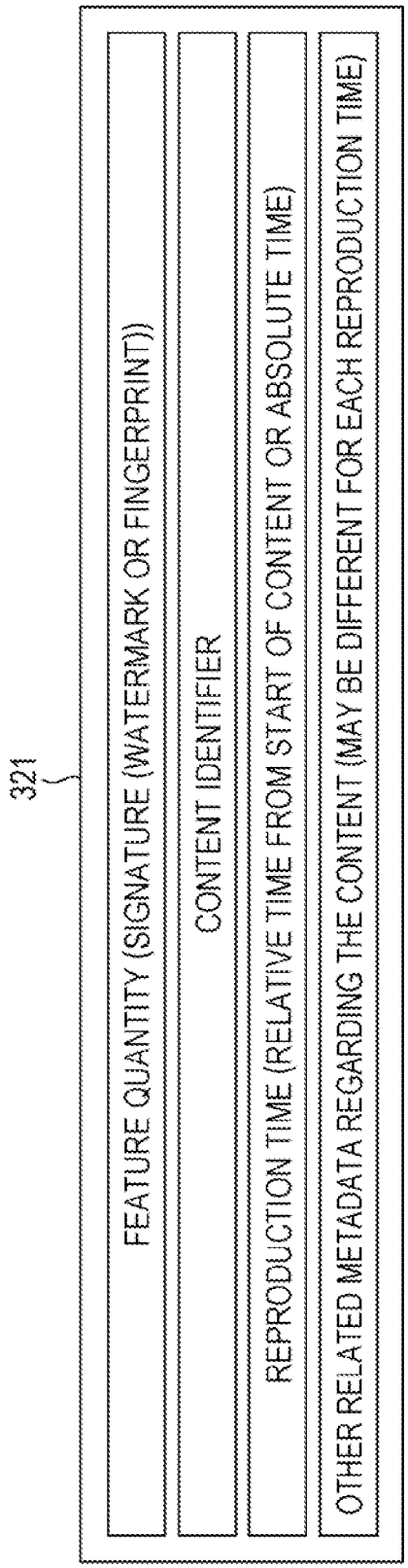
FIG. 14 is a diagram for explaining reference data.

FIG. 14 is a diagram for explaining reference data accumulated in the content attribute database 63 of the ACR server 13 in which data is accumulated when these exchanges with the metadata server 301 are repeated. One unit of reference data 321 in the content attribute database 63 of the ACR server. 13 illustrated in FIG. 14 is assumed to be data in which a feature quantity, a content identifier, a reproduction time, and metadata are associated with one another.

The feature quantity is a feature quantity extracted at step S22, that is, a feature quantity such as luminance, or a signature such as a watermark or a fingerprint. The content identifier is an identifier assigned for uniquely identifying the content, and is supplied as one type of information of the metadata from the metadata server 301, for example.

The reproduction time is a relative time from the start of the content or an absolute time. The metadata is metadata supplied from the metadata server 301, which was received at step S24. Regarding the metadata, even though the content has the same content identifier, if the reproduction time is different, it may be different metadata.

The reference data 321 as described above is generated and accumulated in the ACR server 13. The description will be continued below based on the assumption that such reference data is accumulated.

[Regarding Processing Relating to Supply of Content and Metadata]

Figure 15:
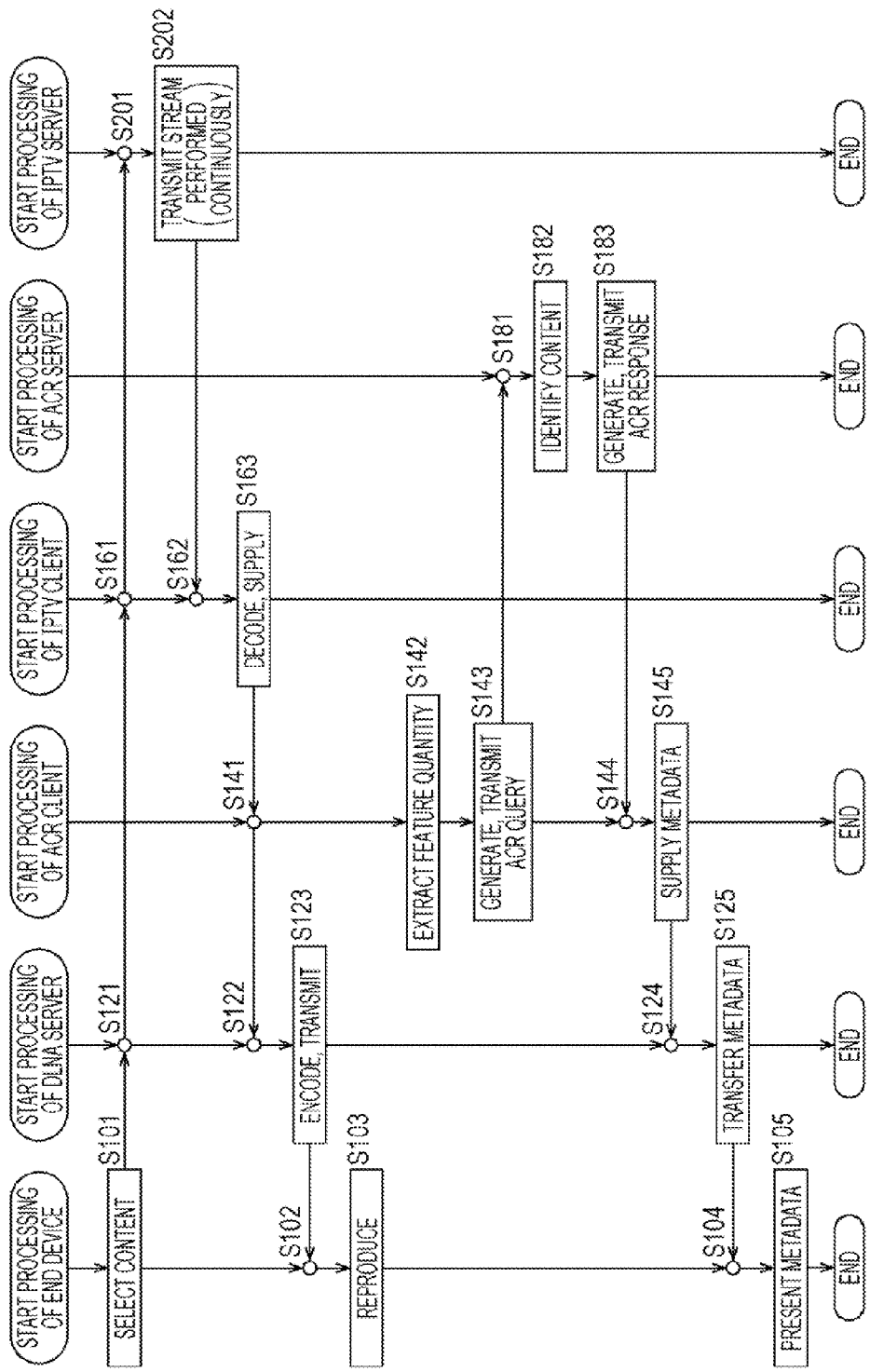
FIG. 15 is a diagram for explaining processing related to supply of metadata.

Next, with reference to the flowchart of FIG. 15, the system illustrated in FIG. 11 and the processing performed in the protocol conversion gateway 201 illustrated in FIG. 12 will be described. The flowchart of FIG. 15 shows processing which can be performed when a user is watching and listening to given content (program) and wishes to watch and listen to information (metadata) associated with the program.

At step S101, content is selected in the end device 131. For example, if the end device 131 is a television receiver, a user operates the remote controller of the television receiver so as to select a program (content) that the user wishes to watch and listen to. Information of the selected channel is supplied to the DLNA server 231 of the protocol conversion gateway 201 over the home network 154. Data exchange between the end device 131 and the DLNA server 231 is performed in DLNA-based format.

At step S121, the DLNA server 231, which received the channel information from the end device 131, supplies the information to the IPTV client 221. At step S161, the IPTV client 221 converts the supplied channel information into data based on IPTV protocol, and transmits it to the IPTV server 151 over the access network 152.

At step S201, when the IPTV server 151 acquires the channel information, a stream of the content being broadcasted on the channel is transmitted. The transmission is performed continuously. The stream of the content, transmitted from the IPTV server 151, is supplied to the IPTV client 221 of the protocol conversion gateway 201 over the access network 152. Between the IPTV server 151 and the IPTV client 221, data based on IPTV protocol is exchanged.

The IPTV client 221, which received the stream from the IPTV 151 at step S162, begins decoding and supplies it to the general-purpose ACR client 121 and the DLNA server 231 at step S163. By the decode processing performed by the IPTV client 221, the video data and the audio data are decoded. The decoded video data and audio data are acquired by the general-purpose ACR client 121 at step S141, and acquired by the DLNA server 231 at step S122.

At step S123, the DLNA server 231 converts (encodes) the supplied video data and audio data into HTTP streaming protocol in DLNA-based format, and transmits it to the end device 131 over the home network 154. This conversion is performed as described with reference to FIG. 10 and the like.

At step S102, the end device 131 receives the encoded audio data and video data from the DLNA server 231. Supply of the sounds based on the received audio data and the images based on the vide data to the user is performed by the end device 131 at step S103. In this way, the content is provided to the user. As decoding by the IPTV client 221, encoding by the DLNA server 231, and reproduction by the end device 131, as described above, are repeated continuously, the content is provided to the user.

While a series of processing for supplying content from the IPTV server 151 to the end device 131, as described above, is performed on one side, in the general-purpose ACR client 121, processing related to acquisition of information (metadata) associated with the content watched and listened to by the user is performed. This means that at step 3142, feature quantities are extracted.

At step S141, the general-purpose ACR client 121 acquired the audio data and the video data decoded by the IPTV client 221. The general-purpose ACR client 121 extracts a feature quantity, based on a predetermined protocol, from the decoded audio data and video data. The feature quantity must be the same as the feature quantity used when the ACR server 13 identifies the content. If the ACR server 13 extracts a feature quantity of luminance from the screen, the general-purpose ACR client 121 also extracts a feature quantity of luminance from the screen. Further, as a feature quantity, a signature such as a watermark or a fingerprint may be used.

Figure 16:
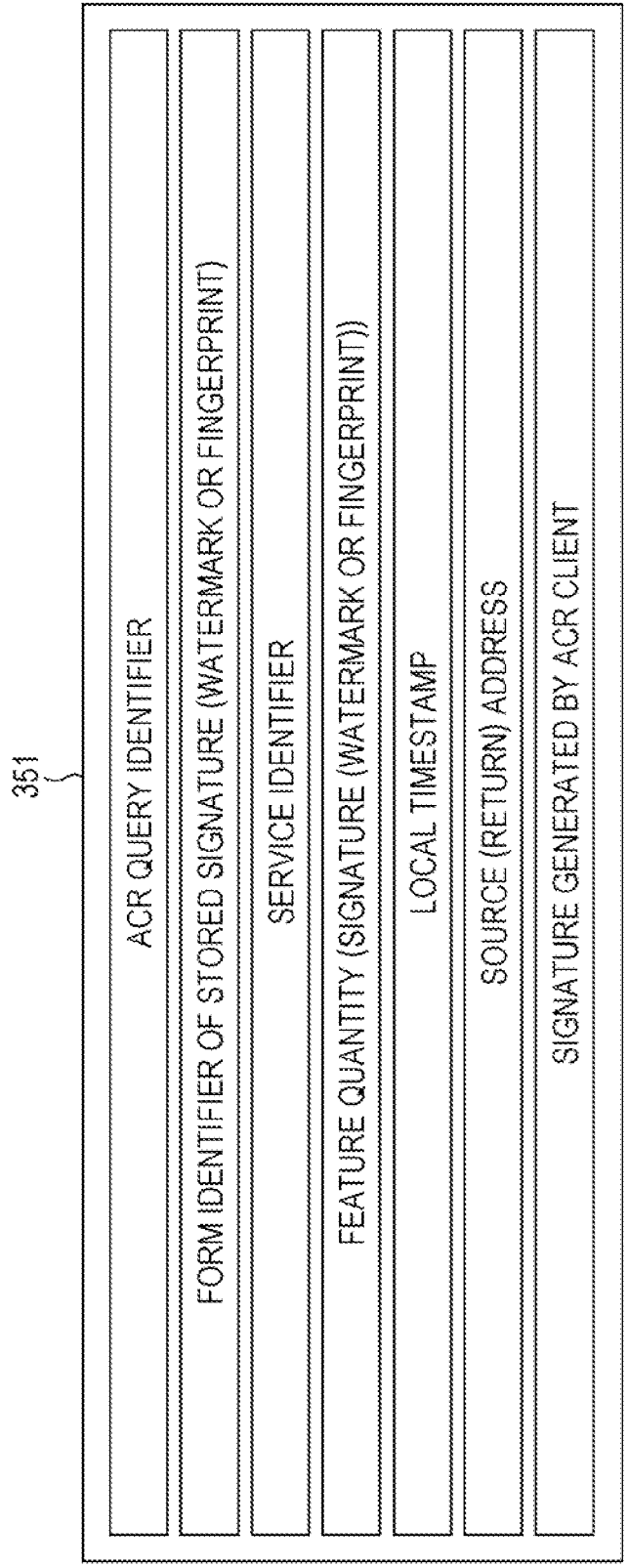
FIG. 16 is a diagram for explaining an ACR query.

At step S143, the general-purpose ACR client 121 generates an ACR query, and transmits it to the ACR server 13. FIG. 16 is a diagram illustrating an example of an ACR query to be generated. An ACR query 351 includes an ACR query identifier, a form identifier, a service identifier, a feature quantity, a local timestamp, a source (return) address, and a signature.

The ACR query identifier, described when needed, is an identifier uniquely identifies the ACR query. The form identifier is an identifier representing the form of the feature quantity or the signature (watermark or fingerprint) stored in the ACR query. The service identifier, described when needed, is an identifier of the ACR service (service for performing content identification by ACR).

The feature quantity is a feature quantity or a signature (extracted watermark or fingerprint). The local timestamp is a value of a local system clock at the point of time when the feature quantity is extracted. The source (return) address, described when needed, is an address of the ACR client to which a response to the ACR query is returned. The signature, described when needed, is a signature for preventing tampering or the like. The entire ACR query may be encrypted, if necessary.

An ACR query containing such data is generated by the general-purpose ACR client 121 at step S143, and is transmitted to the ACR server 13.

Upon receipt of the ACR query at step S181, the ACR server 13 performs identification of the content based on the data included in the ACR query. At step S182, when the ACR server 13 receives the ACR query, the ACR server 13 first checks the form identifier of the ACR and performs matching processing with the ACR form identifier of the ACR reference data in the database. If it is a corresponding ACR form, matching is performed by searching the database using the feature quantity (signature (watermark/fingerprint)) stored in the ACR query.

A matching algorithm depends on the form, and the matching algorithm depending on the form is implemented in the ACR server 13. If there is a hit, the resolved content identifier, reproduction time, and related metadata are returned, as an ACR response, to the address of the source ACR client of the ACR query stored in the ACR query. At this time, related metadata to be stored in the ACR response is selected based on the value of the local timestamp stored in the ACR query. If there is no hit, a response stating that there is no hit is returned to the source of the ACR query, as an ACR response.

Figure 18:
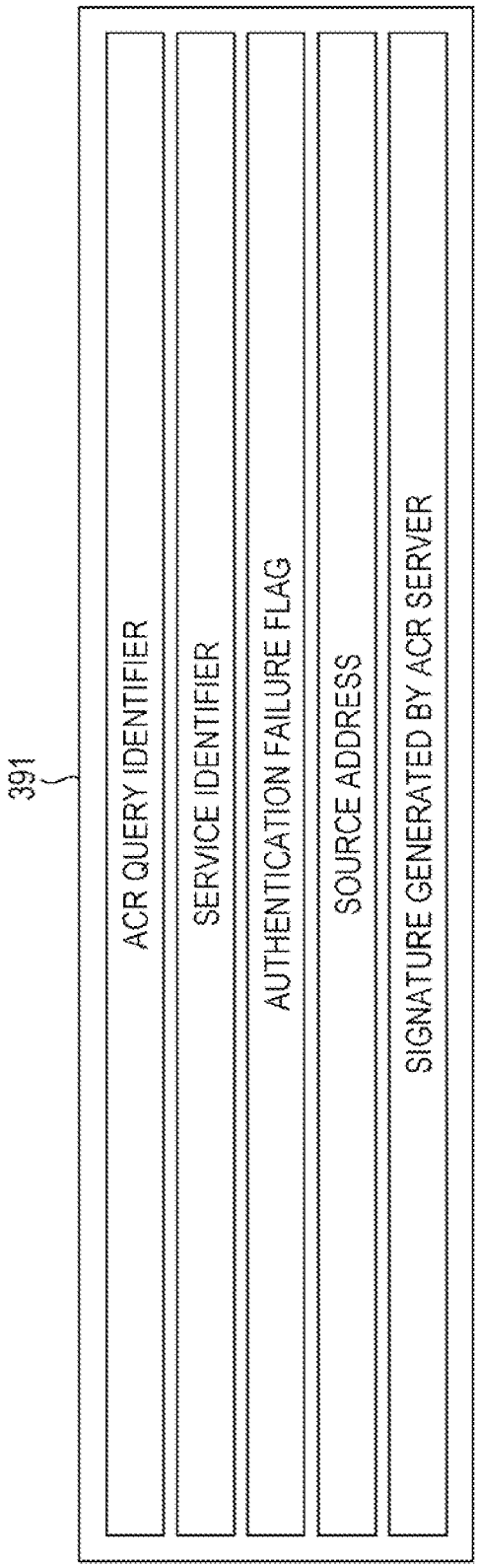
FIG. 18 is a diagram for explaining an ACR response.

The ACR server 13 performs identification of content, generation of an ACR response, and transmission of the ACR response, at step S182 and step S183. Here, examples of ACR responses to be generated and transmitted are illustrated in FIG. 17 and FIG. 18. FIG. 17 illustrates an ACR response if corresponding metadata hits, and FIG. 18 illustrates an ACR response if corresponding metadata does not hit.

Referring to FIG. 17, an ACR response, if corresponding metadata hits, includes an ACR query identifier, a form identifier, a service identifier, a content identifier, reproduction time, a local timestamp, related metadata, a source address, and a signature.

The ACR query identifier, described when needed, is an identifier stored in the ACR query based on which this response is made. The form identifier, described when needed, is an identifier for identifying the form of the feature quantity (signature (watermark or fingerprint)) stored in the corresponding ACR query.

The service identifier, described when needed, is an identifier of the ACR service (service for performing content identification by ACR). The content identifier, described when needed, is an identifier of the recognized content. The reproduction time is a relative time from the start of the content, or an absolute time. The local timestamp, described when needed, is a value of a local system clock at the point of time when the feature quantity is extracted (signature is generated).

The related metadata is another type of related metadata regarding the content and the channel. The related metadata may be different for each reproduction time. The source address, described when needed, is an address of the ACR server 13 of the ACR response. The signature, described when needed, is a signature for preventing tampering or the like. The entire ACR response may be encrypted, if necessary.

Referring to FIG. 18, an ACR response, when related metadata does not hit, includes an ACR query identifier, a service identifier, an authentication failure flag, a source address, and a signature.

The ACR query identifier is an identifier stored in the ACR query based on which this response is made. The service identifier is an identifier for identifying the ACR service (service for performing content identification by ACR), if necessary. The recognition failure flag is a flag showing that recognition failed. The source address is an address of the ACR server of the ACR response. The signature is a signature for preventing tampering or the like. The entire ACR response may be encrypted, if necessary.

At step S183 (FIG. 15), when an ACR response is generated and transmitted by the ACR server 13, at step S144, it is received by the general-purpose ACR client 121 (FIG. 12). Here, description will be continued on the assumption that the ACR response illustrated in FIG. 17 is acquired, and that metadata is acquired. In the present embodiment, it is possible to have a configuration in which if the ACR response illustrated in FIG. 18 is acquired, processing to make an inquiry to another ACR server 13 is performed again and metadata is acquired.

At step S145, the general-purpose ACR client 121 extracts metadata included in the received ACR response, and supplies it to the DLNA server 231. When the DLNA server 231 receives the supplied metadata at step S124, at step S125, the DLNA server 231 transfers the metadata to the end device 131.

The transferred metadata is acquired by the end device 131 at step S104, and is presented to the user at step S105. In this way, information associated with the content is presented to the user.

Here, processing related to transfer of the metadata, performed by the DLNA server 231 at step S125, will be described with reference to FIG. 19. In the case of supplying the metadata to a DLNA client (end device 131) supporting DLNA, CDS (Content Directory Service) defined in the DLNA protocol may be used. Further, metadata may be supplied to the end device 131 by converting the content of the metadata itself into CDS format.

Figure 19:
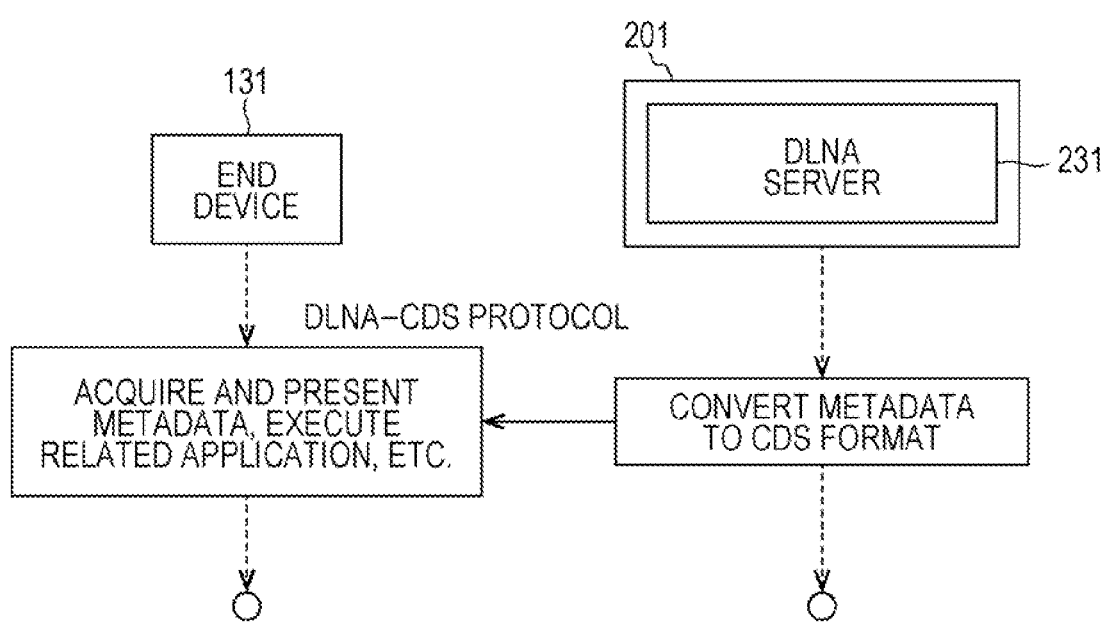
FIG. 19 is a diagram for explaining supply of metadata.

As such, as illustrated in FIG. 19, the DLNA server 231 converts the metadata supplied from the general-purpose ACR client 121 into a format defined by CDS, and supplies it to the end device 131 (DLNA client) using the CDS protocol.

The end device 131 side acquires the metadata converted in the format defined by the CDS and reproduces it to thereby provide the user with the metadata. If the metadata is information regarding the content, information about the story, characters, and the like is provided to the user. Further, if the metadata has the content instructing execution of a related application, the instructed application is executed, and processing by the application is performed.

Figure 20:
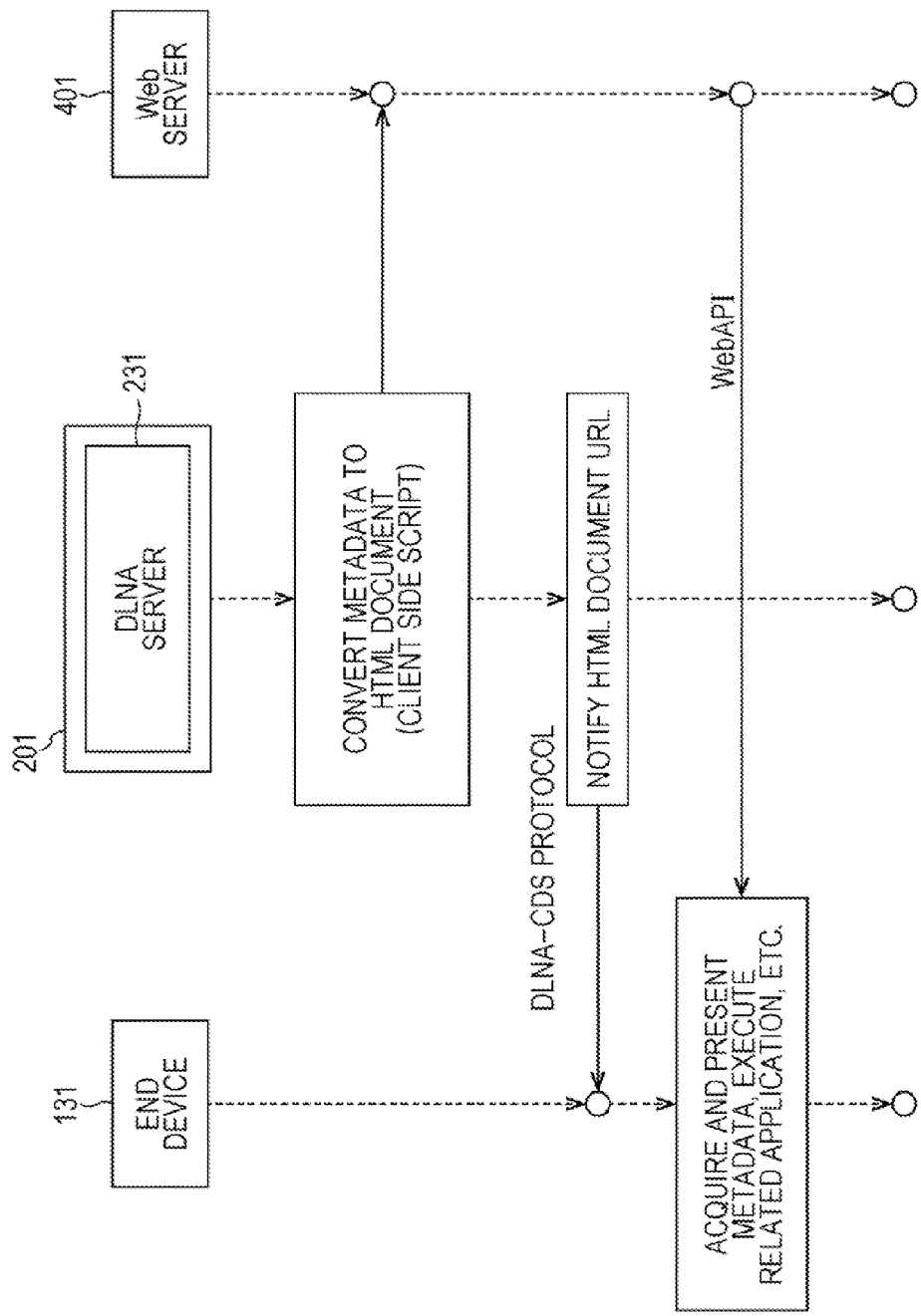
FIG. 20 is a diagram for explaining supply of metadata.

As illustrated in FIG. 20, a form using a web server is also possible. In the case as illustrated in FIG. 20, the DLNA server 231 first converts the metadata itself from the general-purpose ACR client 121 into an HTML document. As an HTML document, a client side script such as Javascript (registered trademark) is applicable. The HTML document is supplied to the web server 401.

Along with conversion processing to the HTML document, the DLNA server 231 stores URL of the web document of the web server 401 in CDS format, and supplies it to the DLNA client (end device 131). Based on the URL, the end device 131 acquires metadata from the web server 401 by Web API. The web server 401 which provides the HTML document can be installed on the protocol conversion gateway 201. Alternatively, it may be installed on a network accessible by the end device 131 which is a DLNA client other than the protocol conversion gateway 201.

Figure 21:
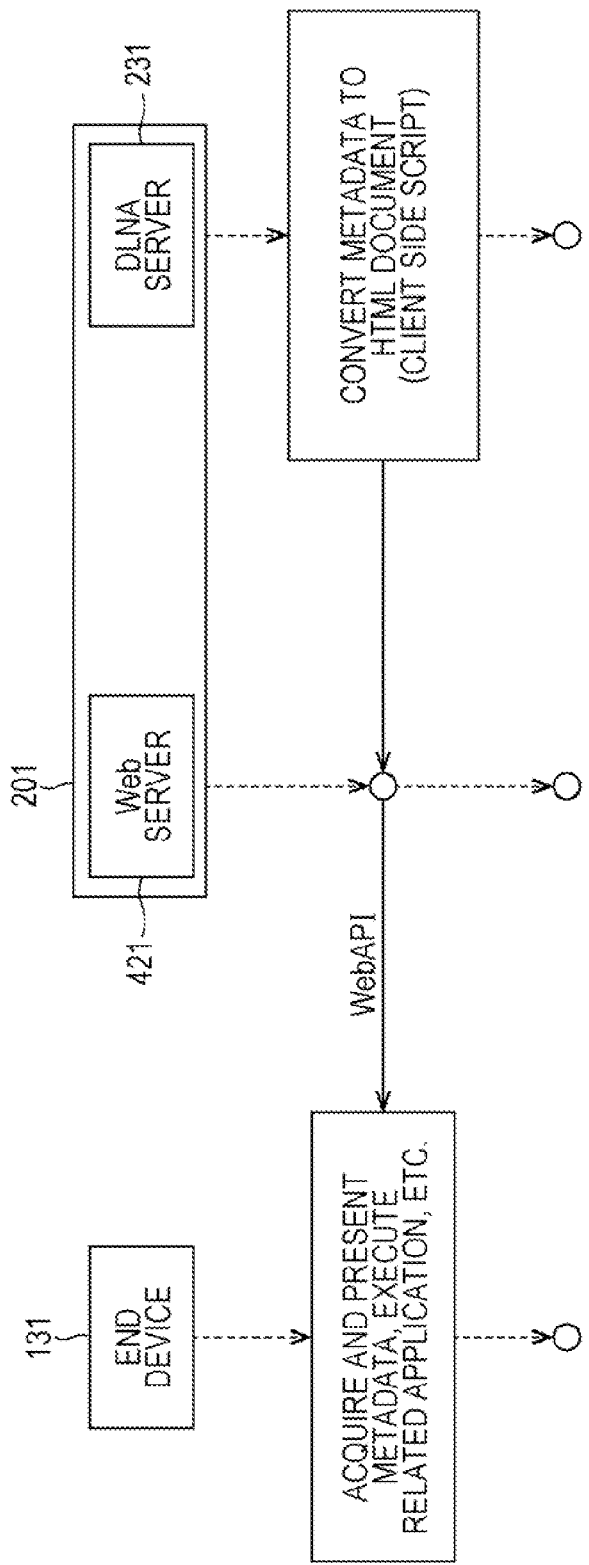
FIG. 21 is a diagram for explaining supply of metadata.
Figure 22:
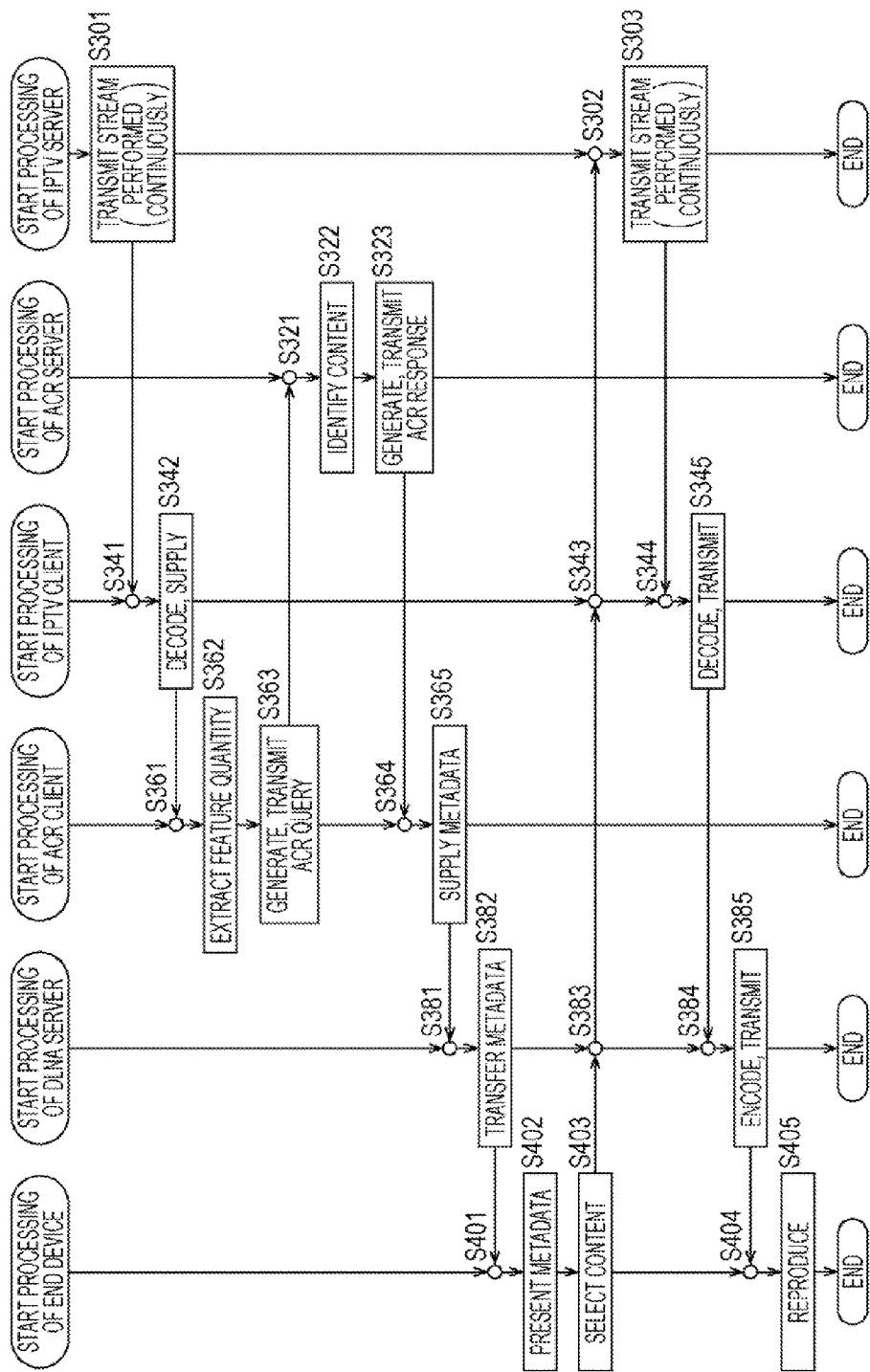
FIG. 22 is a diagram for explaining processing related to supply of metadata.

FIG. 21 illustrates the case were a web server is provided in the protocol conversion gateway 201. The protocol conversion gateway 201 illustrated in FIG. 21 includes a web server 421. In such a configuration, the DLNA server 231 converts the metadata acquired from the general-purpose ACR client 121 into an HTML document (client side script such as Javascript (registered trademark)), supplies it to the web server 421, and the metadata is supplied from the web server 421 to the DLNA client (end device 131) by Web API.

In this way, metadata is supplied to the end device 131. As such processing becomes possible, when a user watches a video posted on a video posting site on the end device 131, it is possible to present metadata to the video, for example. If the video is a video of a broadcasted program, for example, the program is specified through the processing by the general-purpose ACR client 121 and the ACR server 13, and metadata of the specified program is acquired. Accordingly, it is possible to present, to the user, some information with respect to the video posted on such a video posting side.

[Regarding Other Processing Relating to Supply of Content and Metadata]

The processing, described with reference to FIG. 15, was an example of processing in which when content was provided by streaming from the protocol conversion gateway 201 to the end device 131 which was a DLNA client, metadata and application, related to the content, were presented at the same time.

Next, description will be given on the case where a content selection menu is presented on the client side (end device 131 side) based on the metadata provided by the DLNA server 231, content is selected from the menu, and streaming begins. It should be noted that as processing which is basically the same as the processing of the flowchart illustrated in FIG. 15 is included, description of the processing which is same as that of the flowchart illustrated in FIG. 15 is omitted as appropriate.

At step S301, a stream is continuously transmitted from the IPTV server 151. The IPTV client 221, which received the stream as the processing of step S341, decodes the received stream, generates audio data and video data, and supplies them to the general-purpose ACR client 121, at step S341.

At step S361, the general-purpose ACR client 121 acquires the audio data and the video data from the IPTV client 221, and at step S362, extracts a feature quantity (signature). Further, at step S363, an ACR query is generated, and transmitted to the ACR server 13.

At step S321, when the ACR server 13 receives an ACR query from the general-purpose ACR client 121, at step S322, the ACR server 13 identifies content, and returns the identification result as an ACR response. Here, description will be continued on the assumption that there is identified content and metadata is transmitted.

At step S364, when the general-purpose ACR client 121 receives the ACR response, at step 3365, the general-purpose ACR client 121 supplies metadata to the DLNA server 231. For example, when such processing is repeated and metadata related to a plurality of types of content is acquired from a plurality of IPTV servers 13, it is possible to acquire a plurality of kinds of metadata related to programs broadcasted at that time. It is possible to create a program list by using such a plurality of kinds of metadata acquired, and to provide a user with it.

Here, description will be continued on the assumption that such a program list is created by the general-purpose ACR client 121 and is provided to the user. At step S382, the program list is transferred from the DLNA server 231 to the end device 131. The end device 131, which received such a program list at step S401, presents the metadata, that is, presents the program list in this case, at step S402.

The user is able to see the program list and select content. As described above, the program list is created from the content acquired from a plurality of different IPTV servers 13. As such, even though this is one program list from the user's viewpoint, this should be provided as different program lists under ordinary circumstances.

In other words, as a program list could only be provided for each IPTV server 13 conventionally, in the case of searching for items of content provided from a plurality of IPTV servers 13, for example, searching must be performed for each of the IPTV servers 13, which lacks usability. However, by applying the present technology, it is possible to provide one program list for items of content provided by a plurality of IPTV servers 13, whereby the usability can be improved.

When a user selects an item of content from the program list, such information is supplied to the DLNA server 231. As the subsequent processing is similar to the case described with reference to the flowchart of FIG. 15, the description is omitted.

In this way, the user is able to select a desired item of content from the items of content supplied from a plurality of IPTV servers 13 and to watch and listen to it, without recognizing that the items of content are supplied from the IPTV servers 13.

It should be noted that while a program list has been described as an example, the present technology is not limited to a program list. The general-purpose ACR client 121 acquires information related to the identified content which is acquired by the respective ACR clients 101 from the ACR servers 13. At this point, the general-purpose ACR client 121 acquires a plurality of units of information.

The general-purpose ACR client 121 puts together the acquired units of information in one unit of information like a program list, to thereby generate another unit of information. In other words, the general-purpose ACR client 121 generates information in which units of information are put together. The generated information can be supplied to the end device 131. When such information is provided to the user, as the user can see information as one unit of information which should be presented as units of information in ordinary circumstances, the usability can be improved.

[Regarding Recording Medium]

The series of processing described above may be performed by hardware or performed by software. In the case of performing the series of processing by software, programs constituting the software are installed in a computer. Here, the computer includes a computer built in a dedicated hardware, and a general-purpose personal computer, for example, which is able to perform various types of functions by installing various types of programs.

Figure 23:
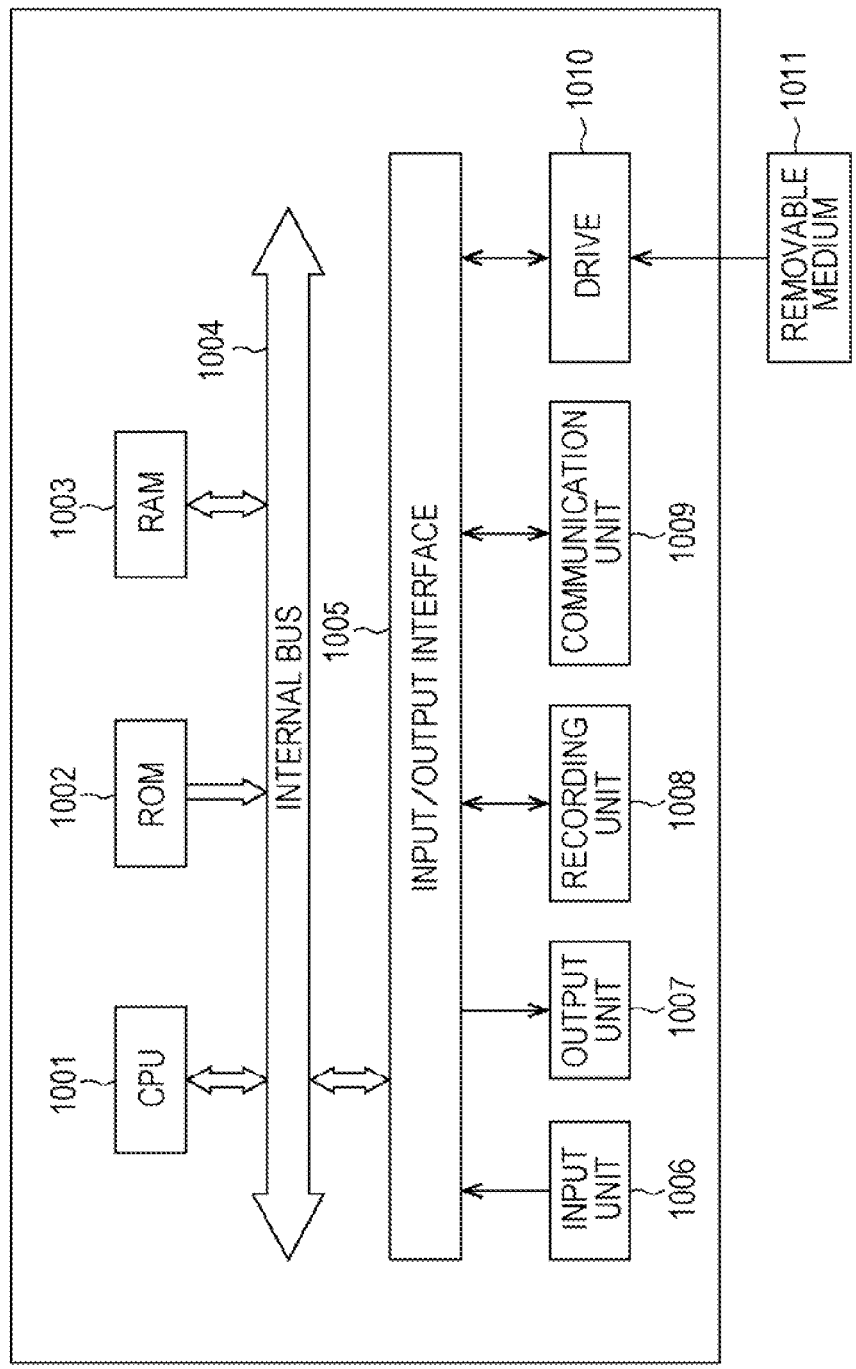
FIG. 23 is a diagram for explaining a recording medium.

FIG. 23 is a block diagram illustrating an exemplary configuration of hardware of a computer in which the series of processing described above is performed by a program. In the computer, a CPU (Central Processing Unit) 1001, a ROM (Read Only Memory) 1002, and a RAM (Random Access Memory) 1003 are connected one another via a bus 1004. The bus 1004 is also connected with an input/output interface 1005. The input/output interface 1005 is connected with an input unit 1006, an output unit 1007, a storage unit 1008, a communication unit 1009, and a drive 1010.

The input unit 1006 is configured of a keyboard, a mouse, a microphone, and the like. The output unit 1007 is configured of a display, a speaker, and the like. The storage unit 1008 is configured of a hard disk, a non-volatile memory, and the like. The communication unit 1009 is configured of a network interface and the like. The drive 1010 drives a removable medium 1011 such as a magnetic disk, an optical disk, a magneto-optical disk, a semiconductor memory, or the like.

In the computer configured as described above, the CPU 1001 loads the program stored in the storage unit 1008 to the RAM 1003 via the input/output interface 1005 and the bus 1004, for example, to thereby perform the series of processing described above.

The program executed by the computer (CPU 1001) can be provided by being recorded on the removable medium 1011 as a package medium or the like, for example. Further, the program can be provided via a wired or wireless transmission medium such as a local area network, the Internet, digital satellite broadcasting, or the like.

In the computer, the program can be installed in the storage unit 1008 via the input/output interface 1005 by placing the removable medium 1011 in the drive 1010. The program may also be received by the communication unit 1009 via a wired or wireless transmission medium, and installed in the storage unit 1008. Further, the program may be installed in advance in the ROM 1002 or the storage unit 1008.

It should be noted that the program executed by the computer may be a program in which processing is performed in chronological order along with the sequence described in the present description, or a program in which processing is performed in parallel or at required timing such as the time when it is called.

Further, in the present description, a system represents all the devices configured of a plurality of devices.

It should be noted that the embodiments of the present technology are not limited to the embodiments described above, and various changes can be made without departing from the scope of the present technology.

It should be noted that the present technology may take the configuration described below.

(1)

An information processing device including:

a first processing unit that processes data with a first device that performs identification of content; and a second processing unit that processes data with a second device that performs reproduction of the content, and processes data with the first processing unit.

(2)

The information processing device according to (1) above, wherein the identification of the content is performed based on ACR (Automatic Content Recognition), the first device is an ACR server, and the first processing unit works as an ACR client that communicates with each of a plurality of ACR servers that performs the ACR using a different protocol.

(3)

The information processing device according to (1) or (2) above, the information processing device being disposed in a gateway provided between the first device and the second device.

(4)

The information processing device according to any of (1) to (3) above, wherein the content is transmitted from a third device over an IP broadband network, and the information processing device further includes a third processing unit that processes data with the third device.

(5)

The information processing device according to (4) above, wherein the third processing unit decodes the content received, the first processing unit extracts data, required when the first device performs the identification, from the decoded content, and transmits the data to the first device, and upon receipt of a result of the identification from the first device, the first processing unit supplies the result to the second processing unit, and the second processing unit supplies the result to the second device.

(6)

The information processing device according to (5) above, further including a fourth processing unit that processes data based on DLNA (Digital Living Network Alliance) with the second device, wherein the fourth processing unit converts the result from the second processing unit to be in a format based on the DLNA, and converts the content from the third processing unit to be in a format based on the DLNA.

(7)

The information processing device according to (2) above, wherein the second processing unit acquires information of identified content from each of the plurality of the ACR servers, generates information in which a plurality of units of the acquired information are gathered, and supplies the information to the second device.

(8)

An information processing method performed by an information processing device including a first processing unit that processes data with a first device, and a second processing unit that processes data with a second device or the first processing unit, the method including the steps of:

by the first processing unit, communicating with the first device that performs identification of content, and processing data exchanged through the communications, and by the second processing unit, communicating with the second device that performs reproduction of the content, and processing data exchanged through the communications, and processing data with the first processing unit.

(9)

A computer-readable program for causing a computer that controls an information processing device, the information processing device including a first processing unit that processes data with a first device, and a second processing unit that processes data with a second device or the first processing unit, to perform processing including:

by the first processing unit, communicating with the first device that performs identification of content, and processing data exchanged through the communications, and by the second processing unit, communicating with the second device that performs reproduction of the content, and processing data exchanged through the communications, and processing data with the first processing unit.

REFERENCE SIGNS LIST

13 ACR server
121 General-purpose ACR client
131 End device
151 IPTV server
152 Access network
154 Home network
221 IPTV client
231 DLNA server

The invention claimed is:

1. An information processing device comprising:
a plurality of communication interfaces including a first communication interface to enable communication with a plurality of ACR (Automatic Content Recognition) servers, and a second communication interface to communicate with an IPTV (Internet Protocol TV) server; and
a processing device to process content received by way of the plurality of communication interfaces and to control transmission of output content received from the plurality of communication interfaces, said content received comprising at least one of television content, video content, audio content, or digital content, and said process includes performing a content identification process based on ACR of the content received by way of the first communication interface,
in which the content identification process involves the information processing device communicating with a first ACR server and the information processing device communicating with a second ACR server of the plurality of ACR servers, the first ACR server configured to perform content identification by use of a first protocol and the second ACR server configured to perform the content identification by use of a second protocol, the first protocol being different from the second protocol, and
in which the processing device is configured to operate as a general-purpose ACR client that enables the communicating with the first ACR server having the first protocol and with the second ACR server having the second protocol.

2. The information processing device according to claim 1, in which the content is received from the IPTV server over an IP broadband network.

3. The information processing device according to claim 1, in which the content identification process involves extracting data.

4. The information processing device according to claim 3, in which the data comprise feature quantities.

5. An information processing method comprising:
communicating with (i) a plurality of ACR (Automatic Content Recognition) servers by way of a first communication interface of an information processing device, and (ii) an IPTV (Internet Protocol TV) server by way of a second communication interface of the information processing device; and
processing, by use of a processing device of the information processing device, content received by way of the first communication interface and the second communication interface, and controlling transmission of output content received therefrom, said content received comprising at least one of television content, video content, audio content, or digital content, and said processing includes performing a content identification process based on ACR of the content received by way of the first communication interface,
in which the content identification process involves the information processing device communicating with a first ACR server and the information processing device communicating with a second ACR server of the plurality of ACR servers, the first ACR server configured to perform content identification by use of a first protocol and the second ACR server configured to perform the content identification by use of a second protocol, the first protocol being different from the second protocol, and
in which the processing device is configured to operate as a general-purpose ACR client that enables the communicating with the first ACR server having the first protocol and with the second ACR server having the second protocol.

6. The information processing method according to claim 5, in which the content is received from the IPTV server over an IP broadband network.

7. The information processing method according to claim 5, in which the content identification process involves extracting data.

8. The information processing method according to claim 7, in which the data comprise feature quantities.

9. A non-transitory computer-readable medium having stored thereon a program for causing a computer that controls an information processing device to perform a method comprising:
communicating with (i) a plurality of ACR (Automatic Content Recognition) servers by way of a first communication interface of the information processing device, and (ii) an IPTV (Internet Protocol TV) server by way of a second communication interface of the information processing device; and
processing content received by way of the first communication interface and the second communication interface, and controlling transmission of output content received therefrom, said content received comprising at least one of television content, video content, audio content, or digital content, and said processing includes performing a content identification process based on ACR of the content received by way of the first communication interface,
in which the content identification process involves the information processing device communicating with a first ACR server and the information processing device communicating with a second ACR server of the plurality of ACR servers, the first ACR server configured to perform content identification by use of a first protocol and the second ACR server configured to perform the content identification by use of a second protocol, the first protocol being different from the second protocol, and
in which the computer operates as a general-purpose ACR client that enables the communicating with the first ACR server having the first protocol and with the second ACR server having the second protocol.

10. The non-transitory computer-readable medium according to claim 9, in which the content is received from the IPTV server over an IP broadband network.

11. The non-transitory computer-readable medium according to claim 9, in which the content identification process involves extracting data.

12. The non-transitory computer-readable medium according to claim 11, in which the data comprise feature quantities.

13. A user device to reproduce received content, said received content comprising at least one of television content, video content, audio content, or digital content, and said user device for use in a system having a plurality of ACR (Automatic Content Recognition) servers, said user device comprising:
a processing device to perform a content identification process based on ACR of the received content,
in which the content identification process involves the user device communicating with a first ACR server and the user device communicating with a second ACR server of the plurality of ACR servers, the first ACR server configured to perform content identification by use of a first protocol and the second ACR server configured to perform the content identification by use of a second protocol, the first protocol being different from the second protocol, and
in which the processing device is configured to operate as a general-purpose ACR client that enables the communicating with the first ACR server having the first protocol and with the second ACR server having the second protocol.

14. The user device according to claim 13, wherein the user device comprises a television receiver.

15. The user device according to claim 13, wherein the content identification process involves extracting data.

16. The user device according to claim 13, wherein the content identification process comprises the use of feature quantities.

* * * * *